(12) United States Patent
Sirotin et al.

(10) Patent No.: US 11,841,042 B2
(45) Date of Patent: Dec. 12, 2023

(54) QUICK-RELEASE INTERCONNECT

(71) Applicant: Octopus Adventure Company LLC, Pawtucket, RI (US)

(72) Inventors: Justin Sirotin, Jamestown, RI (US); Ryan Coyle, Hamden, CT (US); Diau Hall, Exeter, RI (US)

(73) Assignee: Octopus Adventure Company LLC, Pawtucket, RI (US)

( * ) Notice: Subject to any disclaimer, the term of this patent is extended or adjusted under 35 U.S.C. 154(b) by 0 days.

(21) Appl. No.: 17/856,279

(22) Filed: Jul. 1, 2022

(65) Prior Publication Data

US 2023/0013328 A1 Jan. 19, 2023

Related U.S. Application Data

(60) Provisional application No. 63/219,643, filed on Jul. 8, 2021.

(51) Int. Cl.
| | | |
|---|---|---|
| *F16B 2/12* | (2006.01) | |
| *F16M 13/02* | (2006.01) | |
| *F16B 2/18* | (2006.01) | |

(52) U.S. Cl.
CPC ............... *F16B 2/12* (2013.01); *F16B 2/18* (2013.01); *F16M 13/022* (2013.01)

(58) Field of Classification Search
CPC ............ F16M 13/022; F16B 2/12; F16B 2/18
See application file for complete search history.

(56) References Cited

U.S. PATENT DOCUMENTS

| | | | | |
|---|---|---|---|---|
| 4,798,318 A | | 1/1989 | Irwin | |
| 5,282,554 A | * | 2/1994 | Thomas | B62J 9/21 224/431 |
| 5,375,748 A | * | 12/1994 | Katz | B62J 9/27 224/431 |
| 5,406,816 A | * | 4/1995 | Thomas | B62J 9/21 62/239 |
| 6,062,053 A | | 5/2000 | Ho | |
| 6,196,433 B1 | * | 3/2001 | Lohr | B62J 7/00 224/434 |

(Continued)

FOREIGN PATENT DOCUMENTS

| | | |
|---|---|---|
| CN | 202272111 U | 6/2012 |
| CN | 203958433 U | 11/2014 |

(Continued)

*Primary Examiner* — Monica E Millner
(74) *Attorney, Agent, or Firm* — Hinckley, Allen & Snyder, LLP; David R. Josephs

(57) ABSTRACT

The quick release interconnect includes a mount member that includes a cleat and a top hanger seat. An attachment member includes a lower jaw that is spring-biased into an open condition that can be secured closed by a cam-lock lever. An upper jaw hanger is also provided to permit the attachment member to be hung on the top hanger seat while the attachment member and object are oriented in place. The upper jaw hanger member is located over the top hanger seat and then the attachment member is rotated in place so the lower jaw is aligned with the cleat. The cam lock lever is rotated to clamp the lower jaw into communication with the cleat portion of the mount member to secure the attachment member securely to the mount member. To release the attachment member, the process is reversed.

3 Claims, 42 Drawing Sheets

(56) References Cited

U.S. PATENT DOCUMENTS

| | | | |
|---|---|---|---|
| 6,328,190 B1* | 12/2001 | Lohr | B62J 9/21 224/438 |
| 7,448,297 B2* | 11/2008 | Tiong | B62J 50/22 403/383 |
| 7,669,816 B2* | 3/2010 | Crain | F16M 11/10 248/183.3 |
| 7,922,136 B2* | 4/2011 | Lien | B62J 9/21 224/431 |
| 9,994,274 B2 | 6/2018 | van Balveren et al. | |
| 2010/0122994 A1* | 5/2010 | Chuang | B62J 9/21 224/558 |
| 2010/0133309 A1* | 6/2010 | Lee | B62J 9/21 224/420 |
| 2011/0266321 A1 | 11/2011 | Hsueh | |
| 2021/0024158 A1* | 1/2021 | Maguire | F16M 13/02 |

FOREIGN PATENT DOCUMENTS

| | | |
|---|---|---|
| CN | 107444535 A | 12/2017 |
| DE | 202013002459 U1 | 6/2013 |
| DE | 202013011275 U1 | 3/2014 |
| EP | 0172979 A2 | 3/1986 |

* cited by examiner

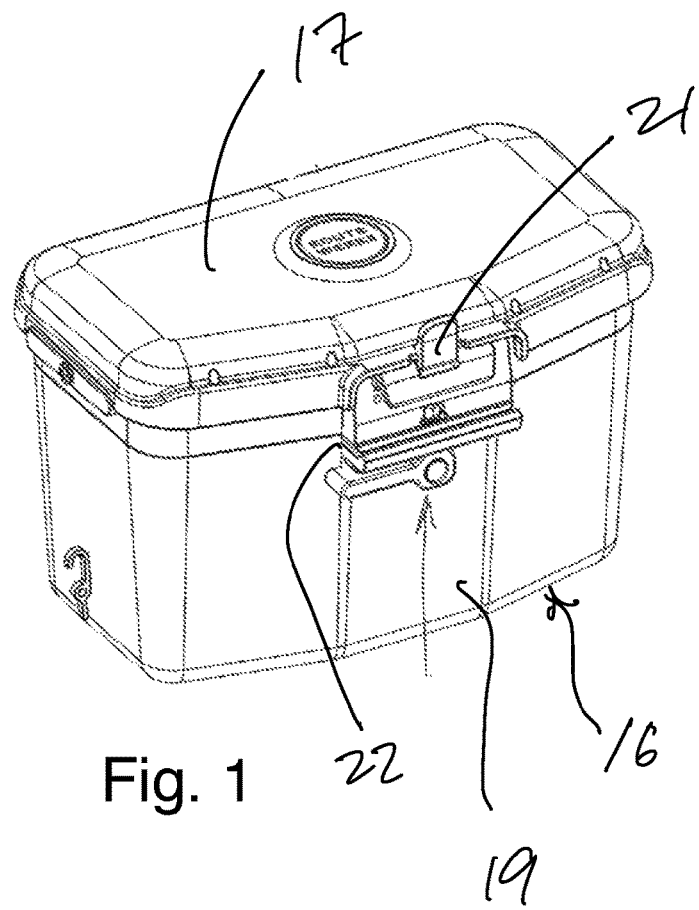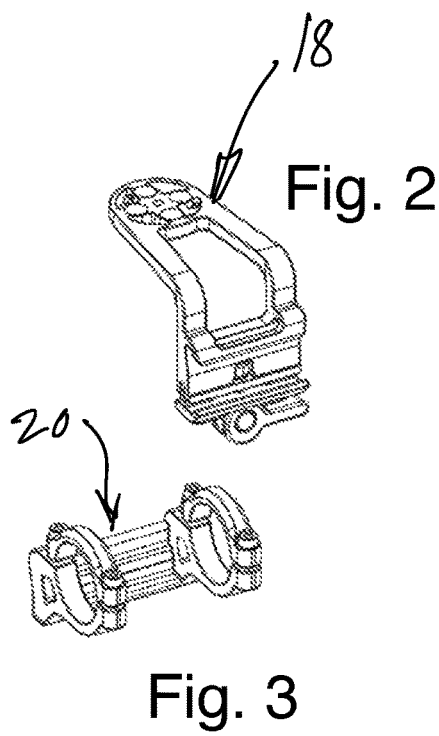

QUICK-RELEASE INTERCONNECT

CROSS REFERENCE TO RELATED APPLICATION

This application is related to, and claims benefit from, U.S. Provisional Application No. 63/219,643, filed on Jul. 8, 2021, entitled "QUICK-RELEASE INTERCONNECT," incorporated by reference in its entirety, herein.

BACKGROUND OF THE INVENTION

The present invention relates generally to a quick-release interconnect. More specifically, the present invention relates to a quick-release interconnect that has particular application in releasably interconnecting two components or objects together, such as a basket or accessory mount to handle bars of a bicycle. The present invention provide a quick-release interconnect that can be used for releasably interconnecting any two objects or components together. For ease of discussion herein, an accessory mount for a bicycle, such as a basket, is discussed herein but it should be understood that the scope of the present invention is envisioned to cover any interconnection environment.

It is well-known in the prior art to interconnect two components or objects together. For example, it is well-known to releasably connect a basket or accessory mount to the handle bars of a bicycle by clamps, hook and loop fasteners, adhesive, straps, buckles, and the like. However, these prior art interconnection or attachment methods suffer from many disadvantages. For example, a basket can be connected to handle bars of a bicycle by clamps that encircle the handle bars where threaded fasteners are tightened down to secure the clamp in place. This prior art configuration suffers from the disadvantage that to remove the basket, the fasteners must be unscrewed to release the clamp. As a result, such a connected basket cannot be easily and quickly removed from the handle bars, such as when the user has arrived at their destination and would like to take the basket, with valuables contained therein, with them.

Therefore, there is a need for a quick-release interconnect system that is particularly well-suited for releasably connected objects, such as a basket, to handle bars of a bicycle.

There is a need for a quick-release interconnect system that can be used for connecting a wide array of other objects, such as an accessory mount, to handle bars of a bicycle.

There is a further need for the quick-release interconnect that can be quickly and easily attached and disconnected.

There is yet a further need for the quick-release interconnect to operable with one hand for ease of operation.

There is a need for a quick-release interconnect to be able to retain the object or component in place even while a cam lever is open and the interconnect is not fully secured closed.

SUMMARY OF THE INVENTION

The instant invention provides a quick-release interconnect that is well-suited releasably connecting components and other objects to the handle bars of a bicycle. The present invention includes a mount member that includes a cleat and a top hanger seat. A clamp member is connected to the mount member so it can be securely and preferably non-releasably connected to handle bars of a bicycle. An attachment member, which is secured to the object, such as a basket, includes a lower jaw that is spring-biased into an open condition that can be secured closed by a cam-lock lever. An upper jaw hanger is also provided to permit the attachment member, and basket attached thereto, to be hung on the top hanger seat while the attachment member and object are oriented in place.

In use, the upper jaw hanger member of the attachment member (with object attached thereto) is first located over the top hanger seat and then the attachment member is rotated in place so the lower jaw, being spring-biased in an open condition by integrated springs, is aligned with the cleat, namely, a notch portion thereof. The basket and attachment member can be released and the lower jaw will remain aligned with the cleat and its notch. Then, against the forces of the integrated springs in the attachment member, the cam lock lever is rotated to thereby clamp the lower jaw into communication with the cleat portion of the mount member, with the assistance of the notch thereof, to secure the attachment member, with basket or other object attached thereto, securely to the mount member. Therefore, a basket or other object is quickly and easily attached to the handle bars of a bicycle.

To remove the basket from the handle bars, the process is reversed. Namely, the cam lock lever is rotated in the opposite direction to release the lower jaw from the cleat of the mount member. The integrated springs on the attachment member spring-biases the lower jaw open to release it from the cleat. Then, the attachment member, and basket or other object attached thereto, are rotated up and away from the cleat to clear the opened lower jaw from the cleat to release the basket from the handle bars.

Therefore, an object of the present invention is to provide a quick-release interconnect system that is particularly well-suited for releasably connected objects, such as a basket, to handle bars of a bicycle.

Another object of the present invention is to provide a quick-release interconnect system that can be used for connecting a wide array of other objects, such as an accessory mount, to handle bars of a bicycle.

Yet another object of the present invention is to provide a quick-release interconnect that can be quickly and easily attached and disconnected.

Another object of the present invention is to provide a quick-release interconnect that is operable with one hand for ease of operation.

Another object of the present invention is to provide a quick-release interconnect to be able to retain the object or component in place even while a latch is open and the interconnect is not fully secured closed.

Other objects, features and advantages of the invention shall become apparent as the description thereof proceeds when considered in connection with the accompanying illustrative drawings.

BRIEF DESCRIPTION OF THE DRAWINGS

The novel features that are characteristic of the present invention are set forth in the appended claims. However, the invention's preferred embodiments, together with further objects and attendant advantages, will be best understood by reference to the following detailed description taken in connection with the accompanying Figures in which:

FIG. 1 shows a perspective view of an attachment member secured to a basket in accordance with the present invention;

FIG. 2 shows a perspective view of an attachment member integrated into an accessory interface in accordance with the present invention;

FIG. 3 is a mount member of the present invention;

DETAILED DESCRIPTION OF THE PREFERRED EMBODIMENT

Figure 4:
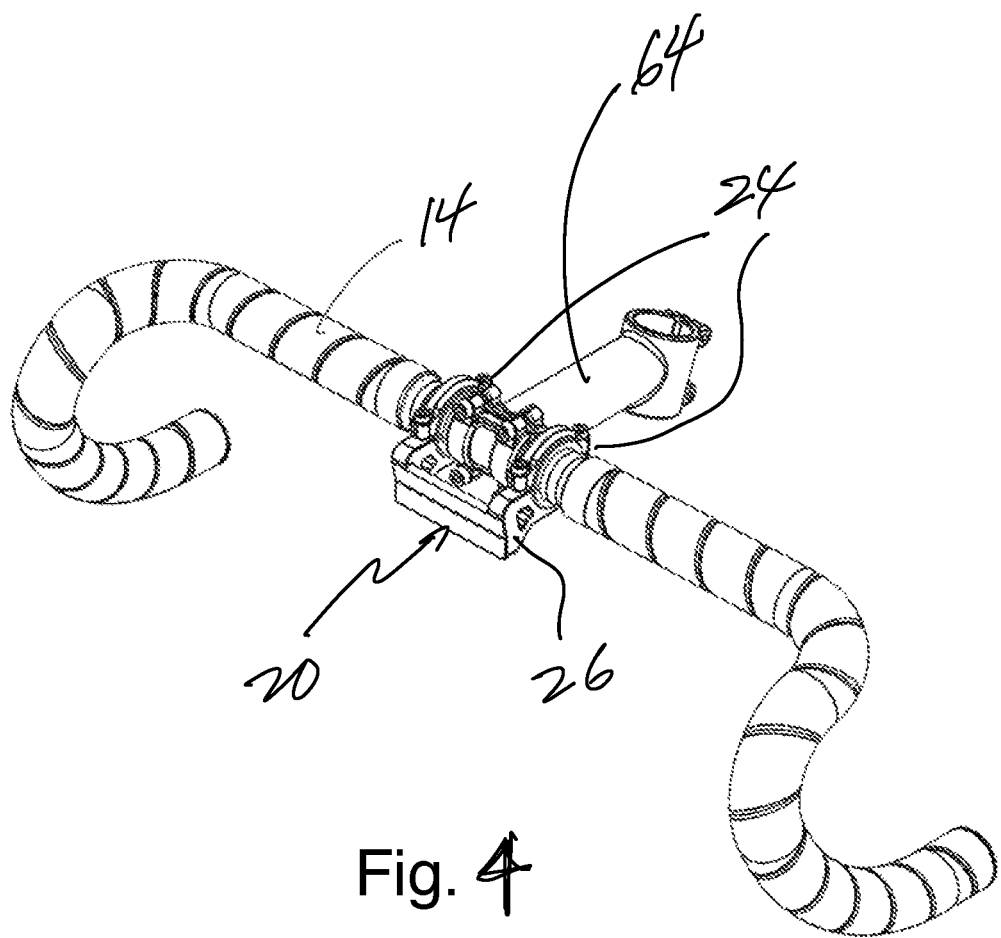
FIG. 4 is a perspective view of the mount member of FIG. 3 secured to handle bars.

The new and unique quick-release interconnect system 10 of the present invention is described in detail below.

Turning first to FIGS. 1-3, a perspective view of the quick-release system 10 of the present invention is shown used for attaching objects to bicycle handle bars 14 of a bicycle 64, as an example of use of the present invention. FIGS. 1-3 shows various components of the system 10 of the present invention. In FIG. 1, a basket attachment member 12 is secured to the object, such as a storage basket 16. An accessory attachment member 18 is shown in FIG. 2 to receive accessories, such as cameras, lights, fans, and the like. The mount member 20 is shown in FIG. 3, which is to be secured to handle bars 14 of a bicycle 64. As will be described in detail below, either the basket attachment member 22 of FIG. 1 or the accessory attachment member 18 of FIG. 2 is releasably secured to the mount member 20 of FIG. 3 when it is secured to handle bars 14. Therefore, a basket attachment member 22 with basket 16 secured thereto and an accessory attachment member 18 are interchangeably securable to the mount member 20 and are both similarly releasably secured to the mount member 20.

It should be understood that the basket accessory attachment member 22 and the accessory attachment member 18 are examples of different types of attachment member configurations in accordance with the present invention.

Figure 5:
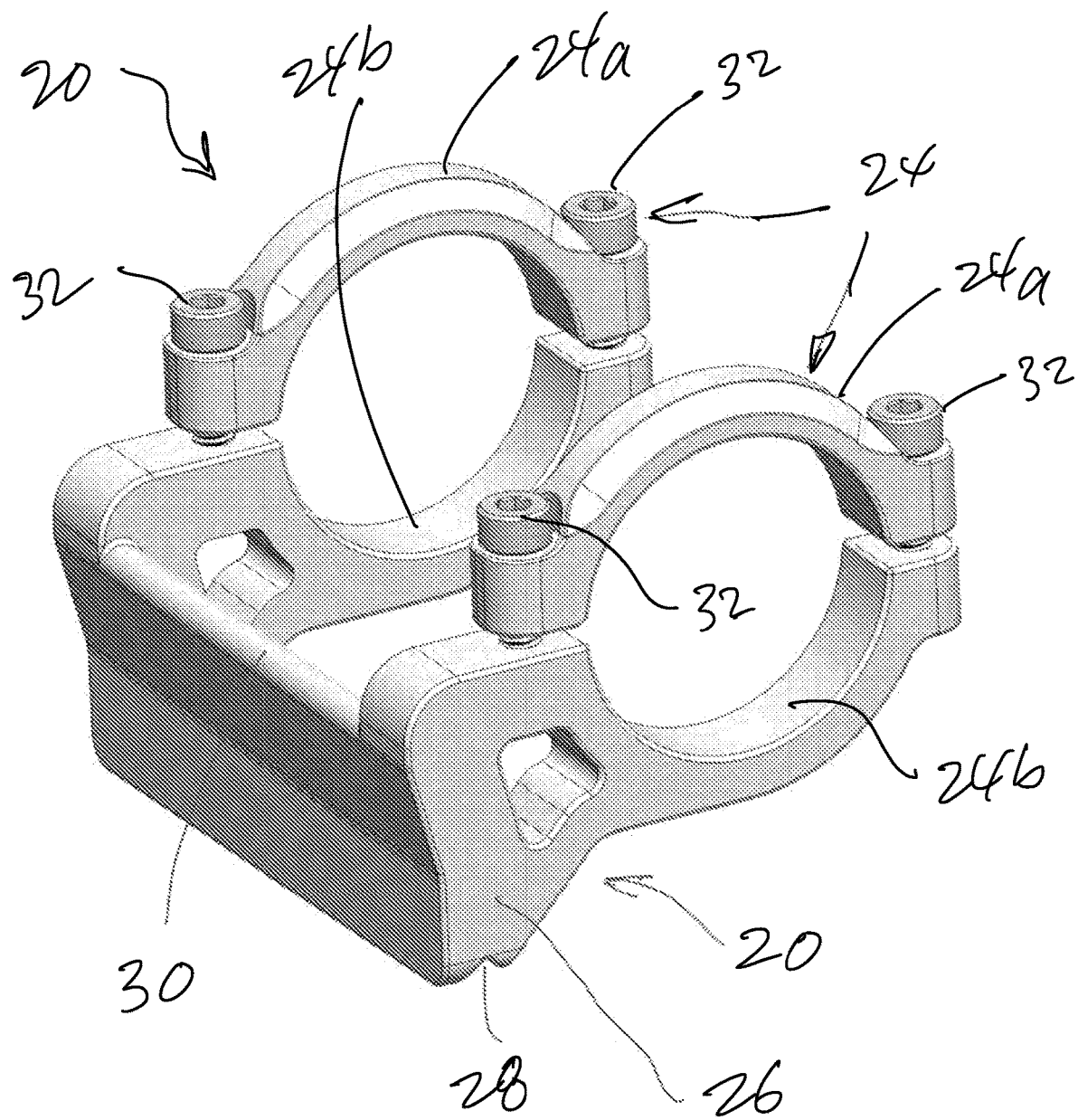
FIG. 5 is a close-up top perspective view of the mount member of FIG. 3.
Figure 6:
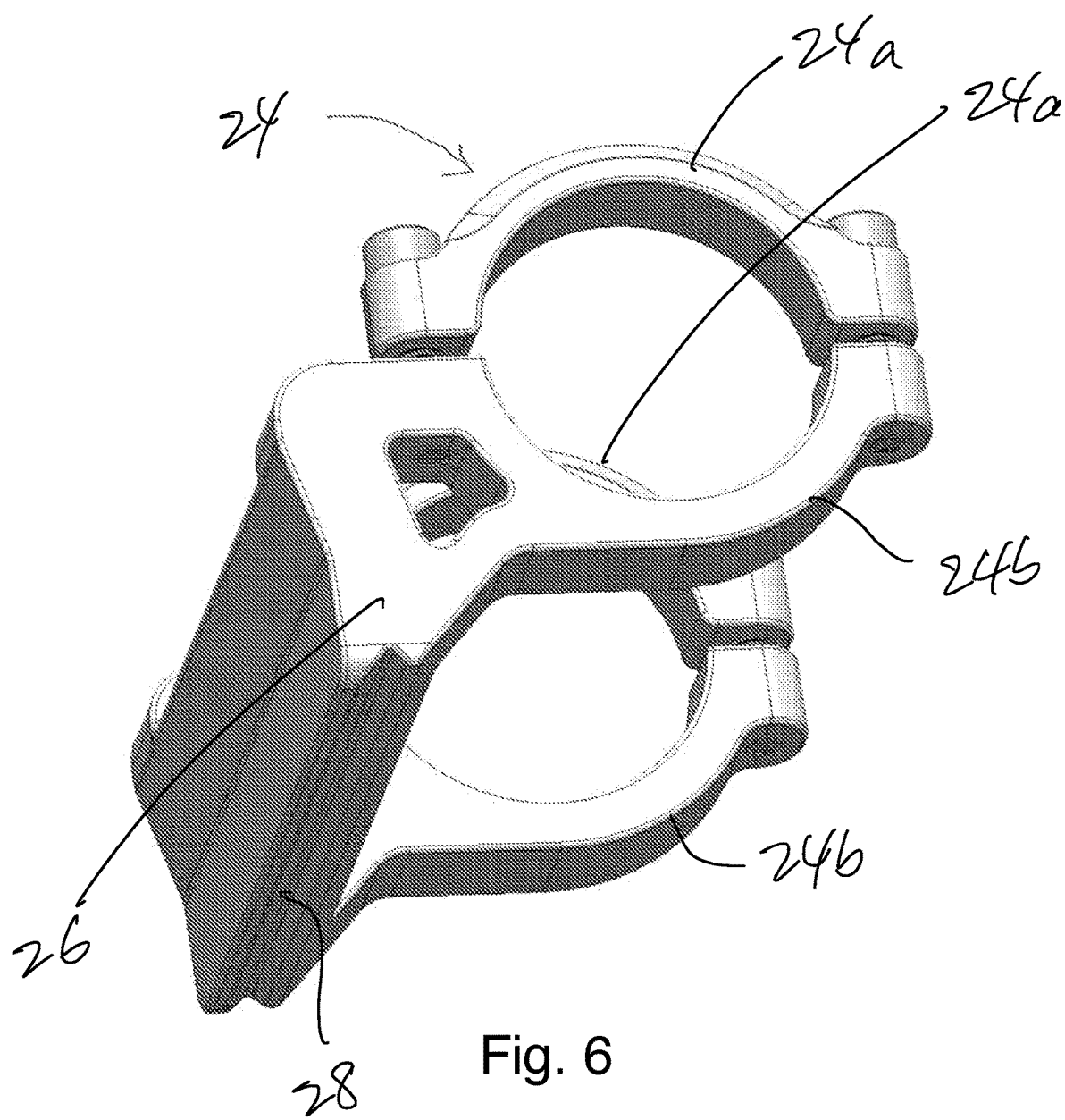
FIG. 6 is a close-up bottom perspective view of the mount member of FIG. 3.

FIGS. 4-6 show the mount member 20 in detail. In FIG. 4, the mount member 20 is generally shown to be secured to handle bars 14 via clamps 24 while FIGS. 5 and 6 show details of the construction of the mount member 20. A cleat 26 is provided with a transverse notch 28 is along with the hanger seat 30. The clamps 24 are preferably integrally connected to the cleat 26 of the mount member 20 and have a top portion 24a that is secured to the base portion 24b of the clamps 24 via threaded fasteners 32. Other mechanisms may be used to provide the releasable clamping action. As in FIG. 4, the clamps 24 are used to secure the mount member 20 in place on the handle bars 14. The top portion 24a of the clamps 24 is separated from the lower portion 24b of the clamps 24 by removal of the threaded fasteners 32. The mount member 20 is then located in place on the handle bars 14 where desired and then the top portion 24a of the clamps 24 is mated with the respective lower portions 24b and then secured in place with the fasteners 32, as shown in FIG. 4.

Figure 7:
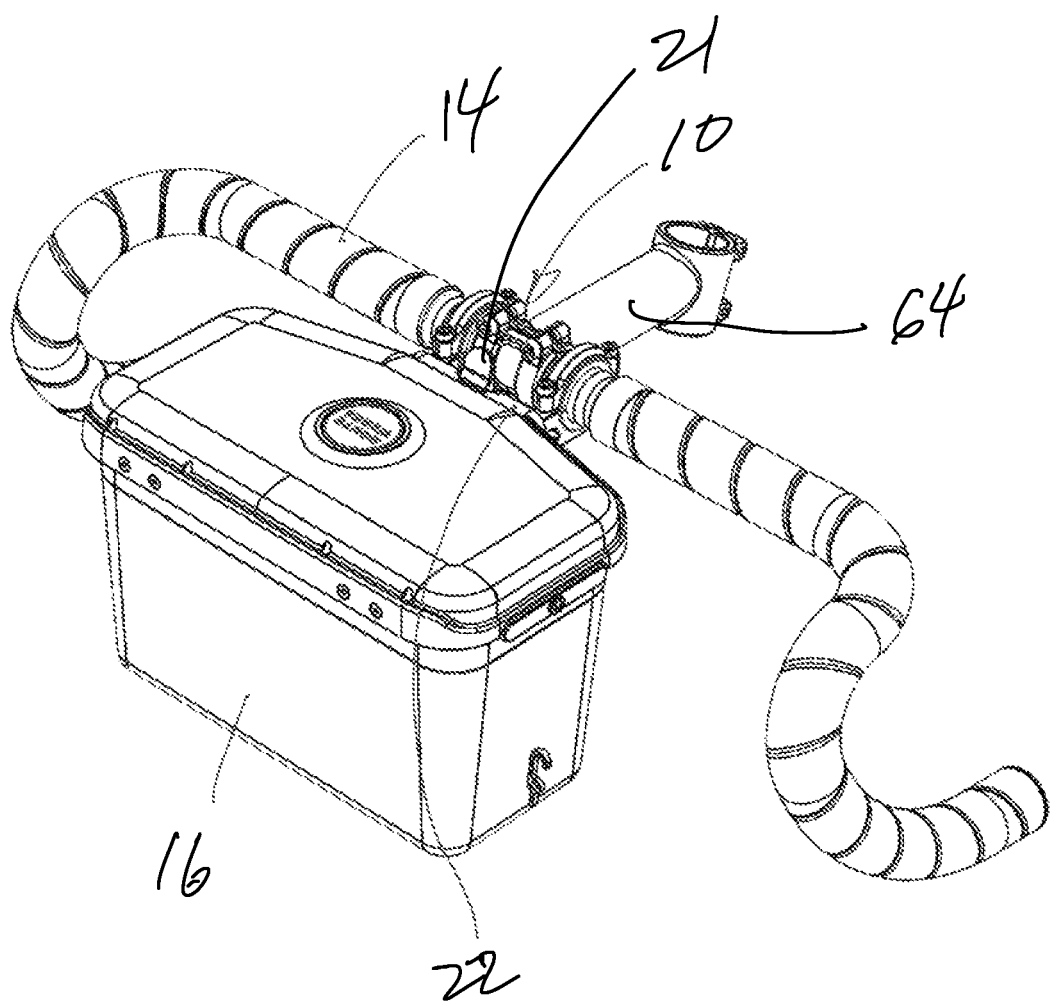
FIG. 7 is a perspective view of a basket releasably secured to handle bars in accordance with the present invention.
Figure 8:
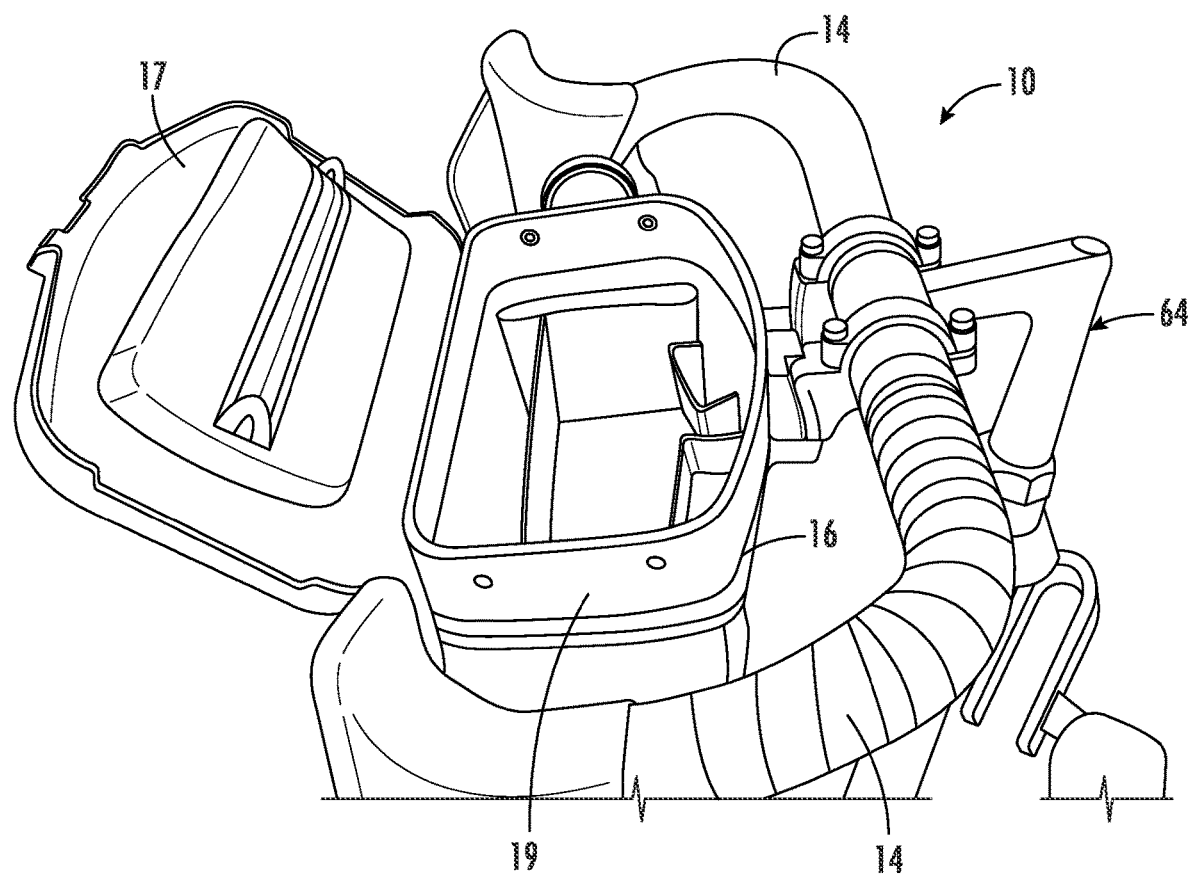
FIG. 8 is a perspective of the basket of FIG. 7 with the lid open for access to the contents therein.

Referring now to FIGS. 7-8, a first embodiment of the quick-release interconnect 10 of the present invention is shown to secure a basket 16 to handle bars 14 using the basket attachment member 22 of FIG. 1. FIG. 7 shows the basket 16 with its lid 17 closed while FIG. 8 shows the lid 17 of the basket 16 open so the contents therein can be accessed. A spring-biased lid release member 21 keeps the lid closed, when desired.

Figure 9:
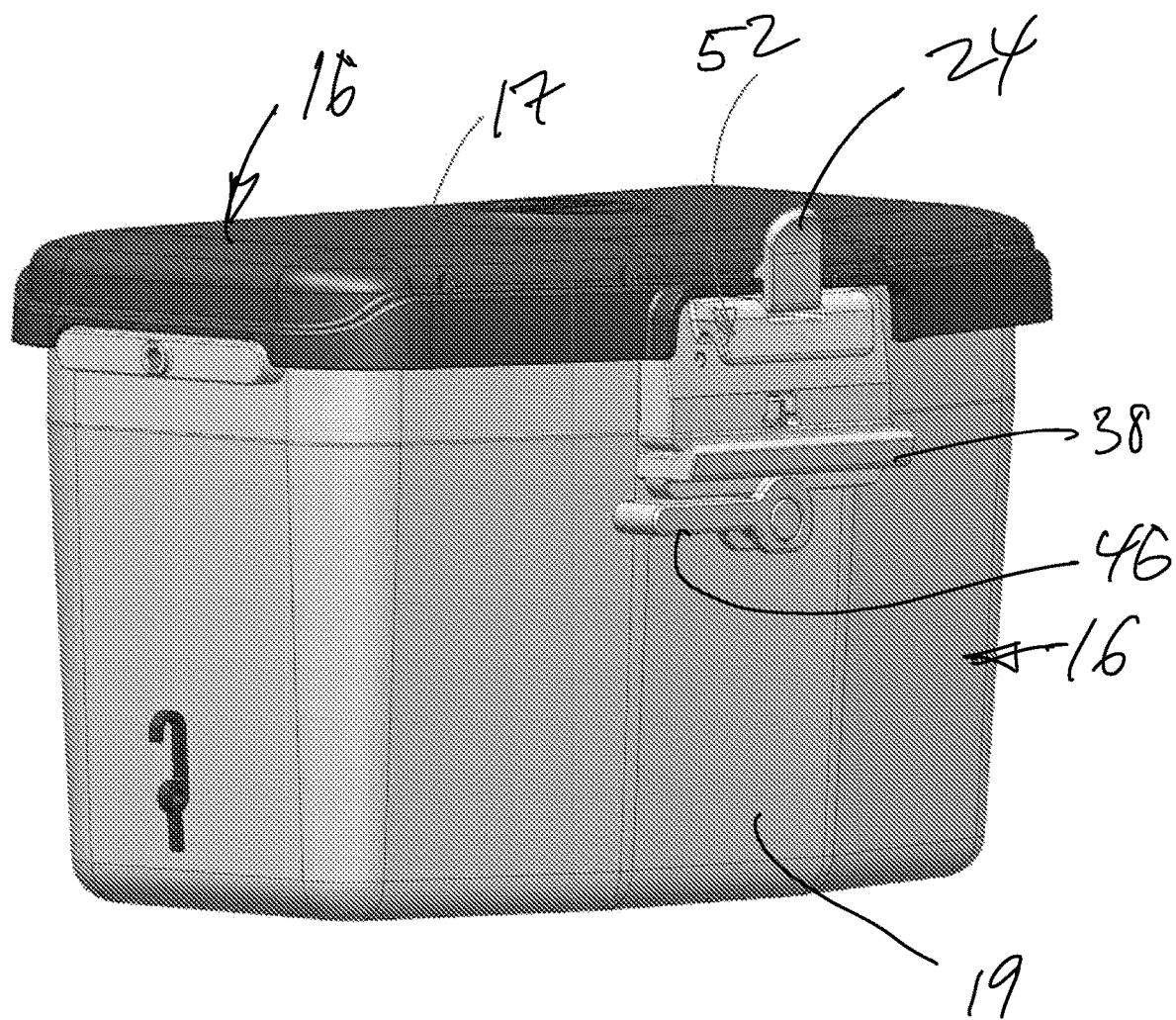
FIG. 9 is a rear perspective view of the basket with attachment member secured thereto.
Figure 10:
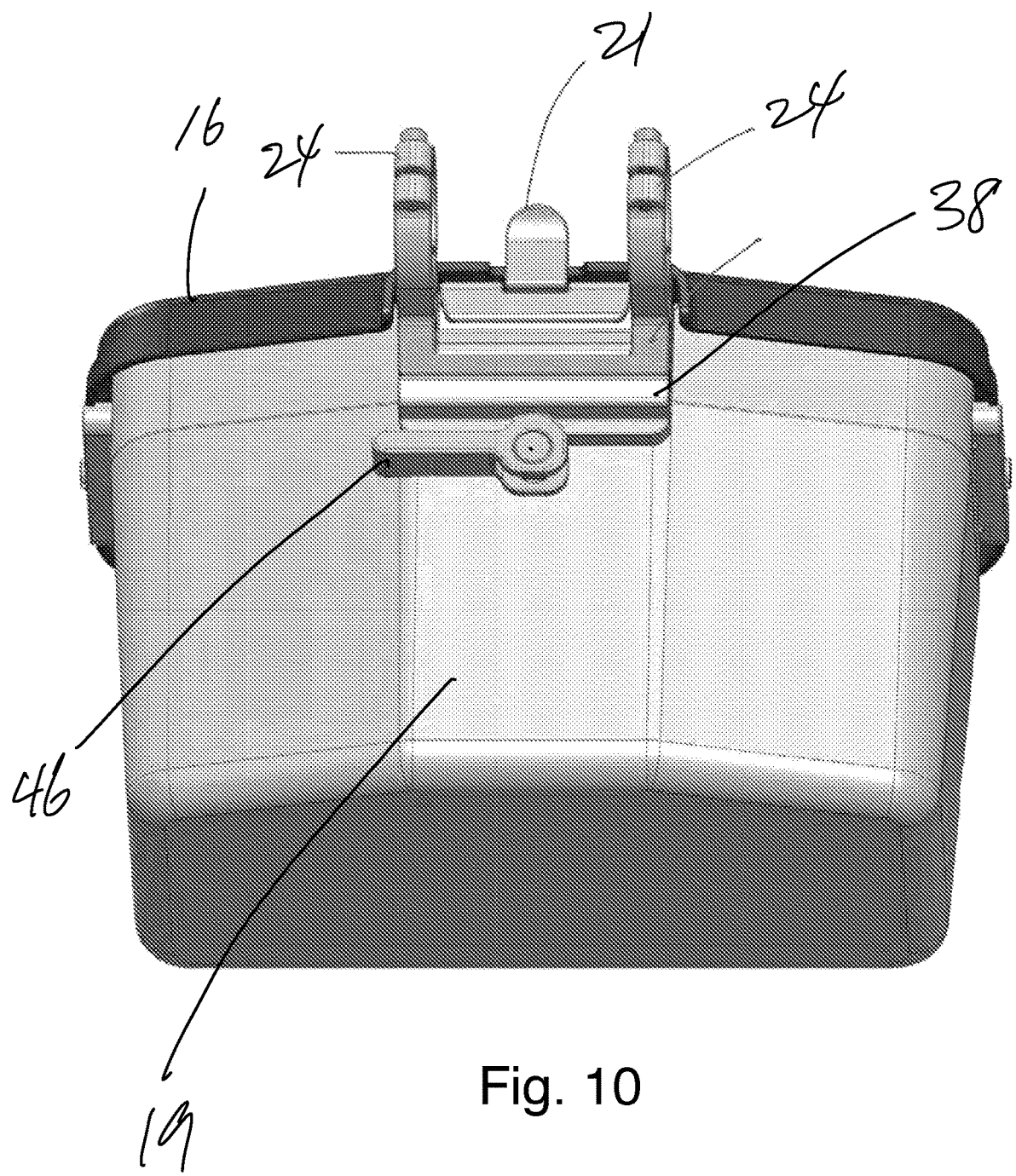
FIG. 10 is a bottom rear perspective view of the basket with attachment member secured thereto.
Figure 11:
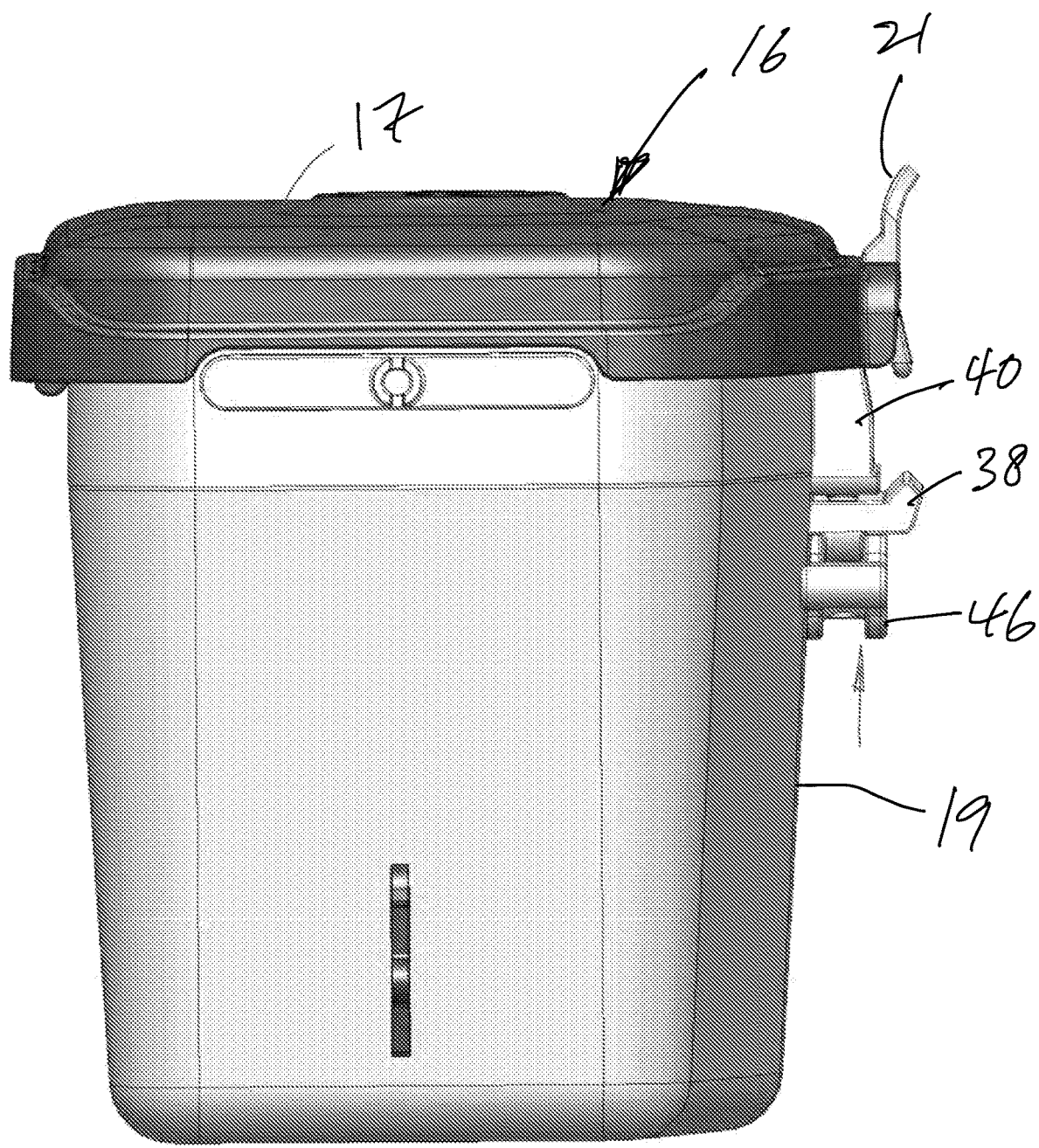
FIG. 11 is a side elevational view of the basket of FIG. 9.
Figure 12:
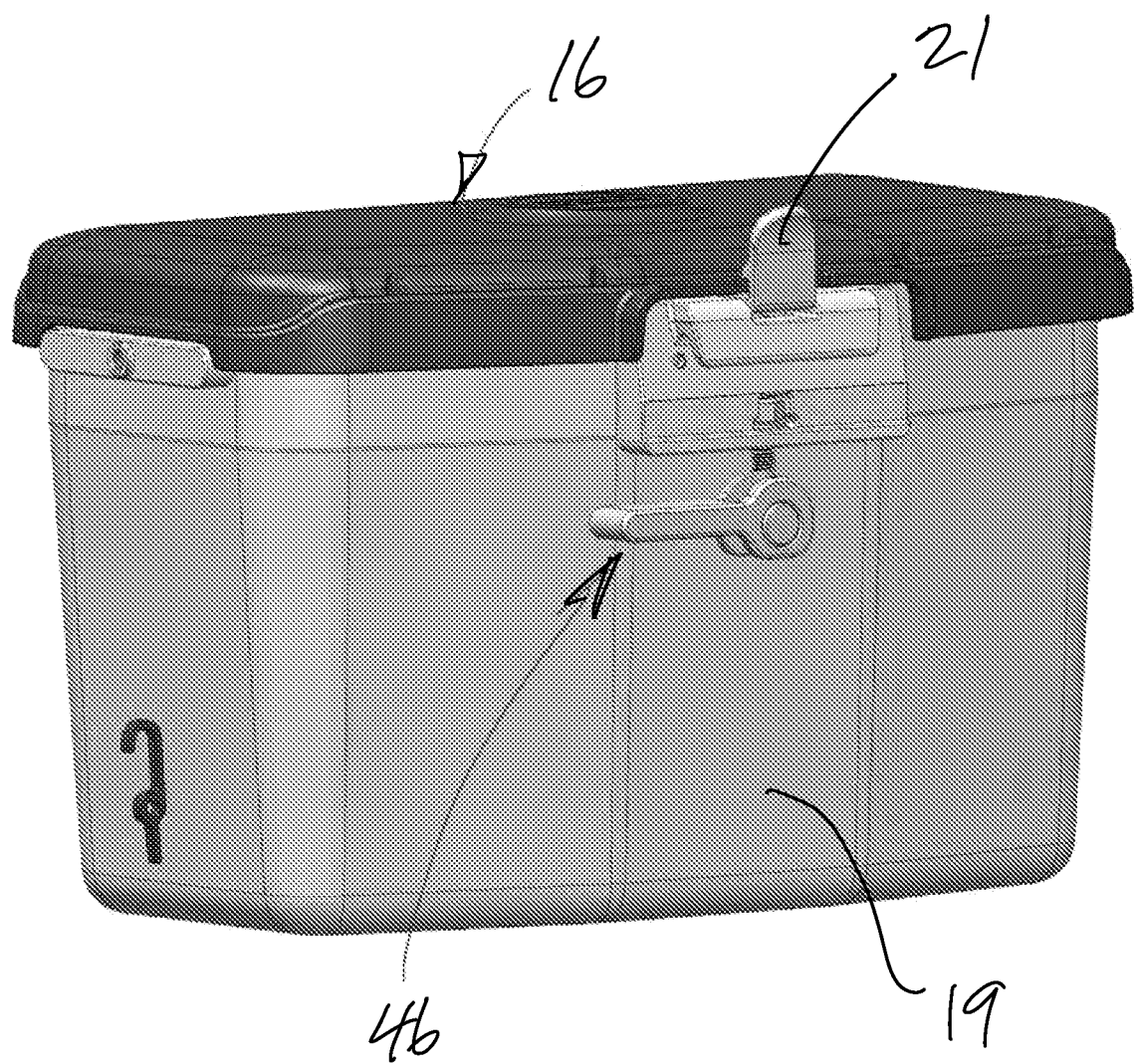
FIG. 12 is rear perspective view of the basket with attachment member secured thereto with the lower jaw is removed for illustration and explanatory purposes.
Figure 13:
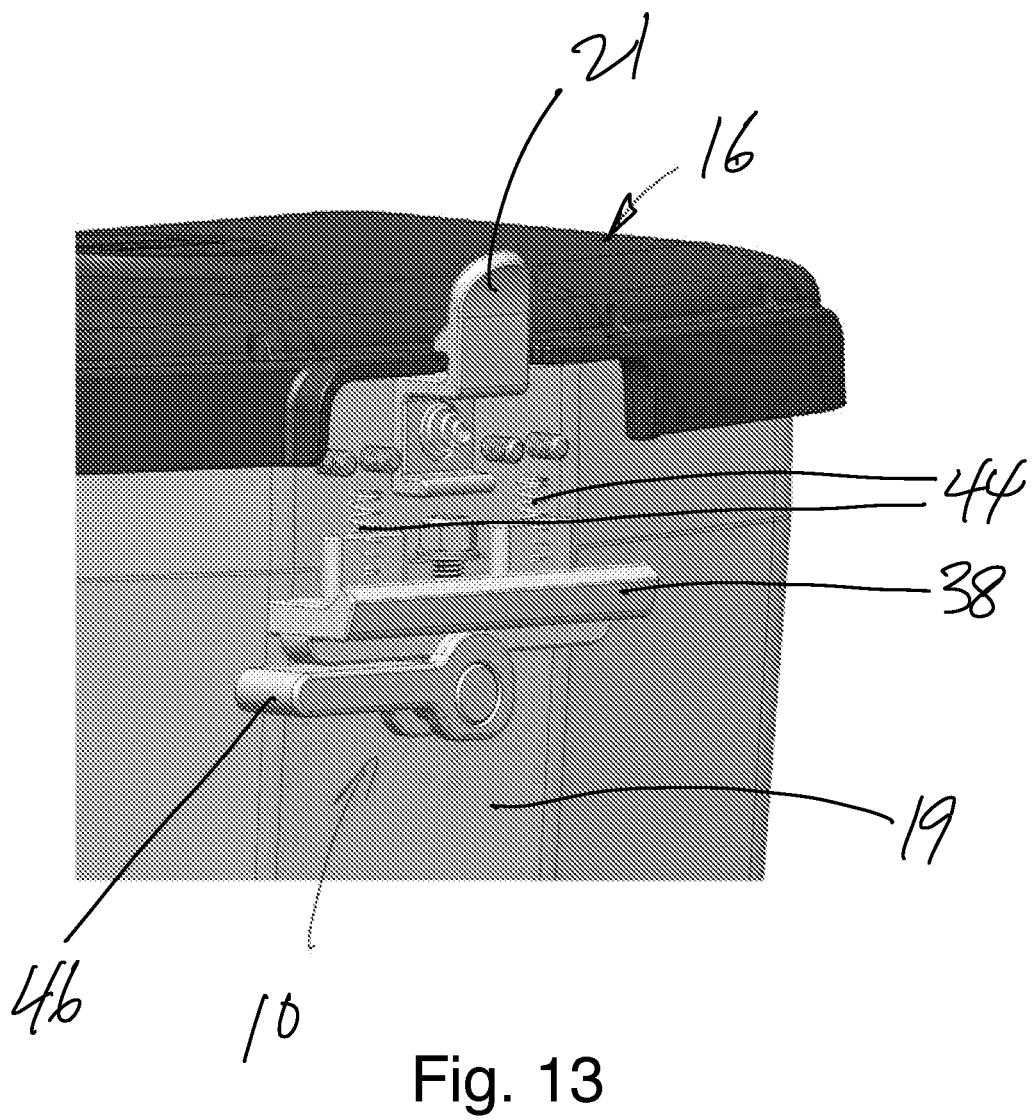
FIG. 13 shows the attachment with the main body removed for illustration purposes where the springs, for spring-biasing the lower jaw, can be easily seen.
Figure 14:
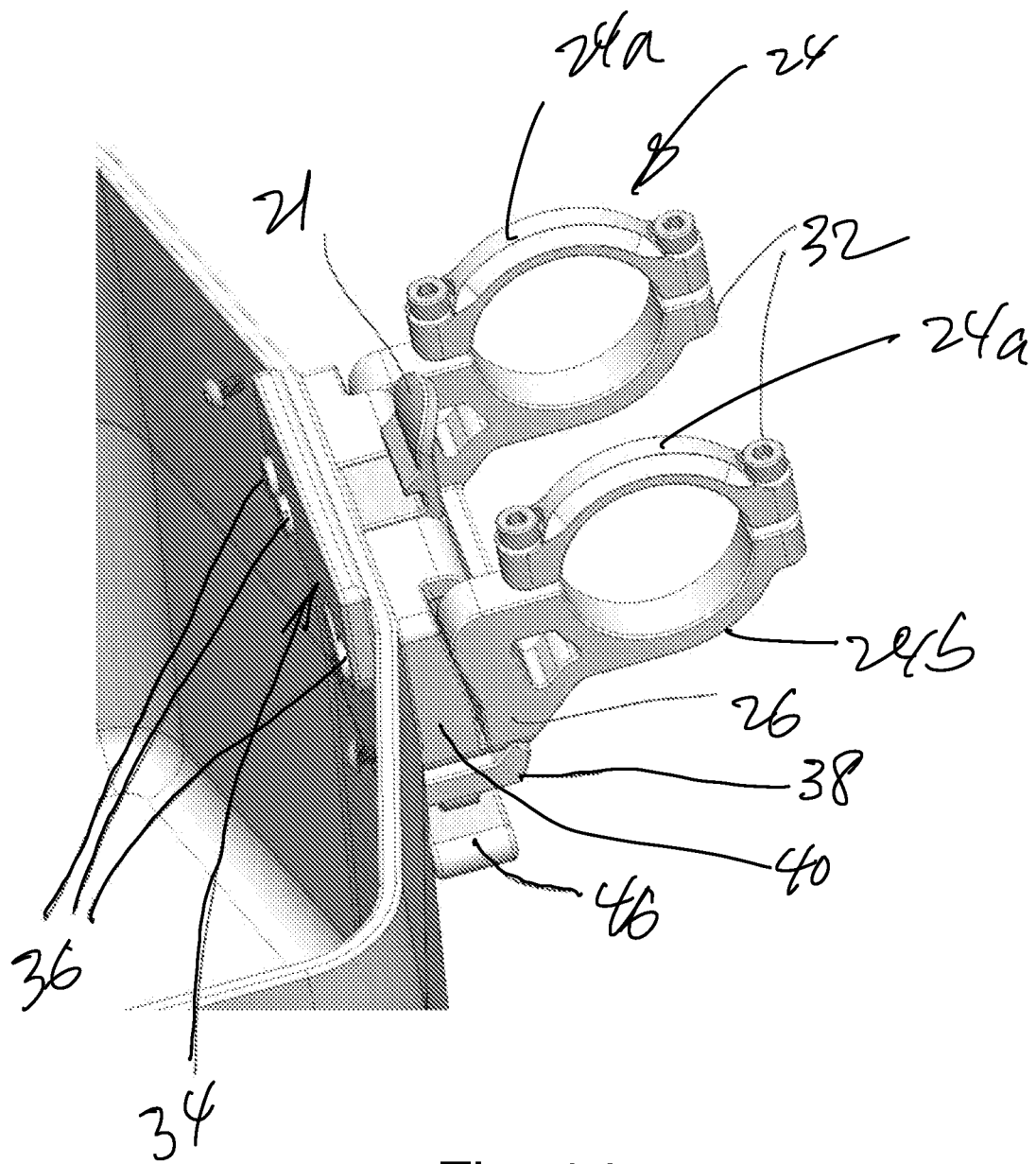
FIG. 14 is a top perspective view of the attachment member secured to the basket with the lid open.

FIGS. 9-14 show additional exterior views of the first embodiment of the present invention different. The basket attachment member 22 is secured to the housing wall 19 of the basket 16 by fasteners 36, or the like, with the assistance of a connection plate 34. FIG. 12 is rear perspective view of the basket 16 with basket attachment member 22 secured thereto with the lower jaw 38 is removed for illustration and explanatory purposes. Lower jaw 38 is shown in FIG. 9, for example. FIG. 13 shows the attachment with the main body 40 removed for illustration purposes where the springs 44, for spring-biasing the lower jaw 38, can be easily seen. In FIG. 14, the connection plate 34 is shown fastened to the rear wall 19 of the basket 16 to provide the basket 16 with attachment member capability. A spring-lock is used in the basket 16 embodiment for releasably securing the lid 17 of the basket 16, as can be seen in a closed condition in FIG. 17, for example.

Figure 15:
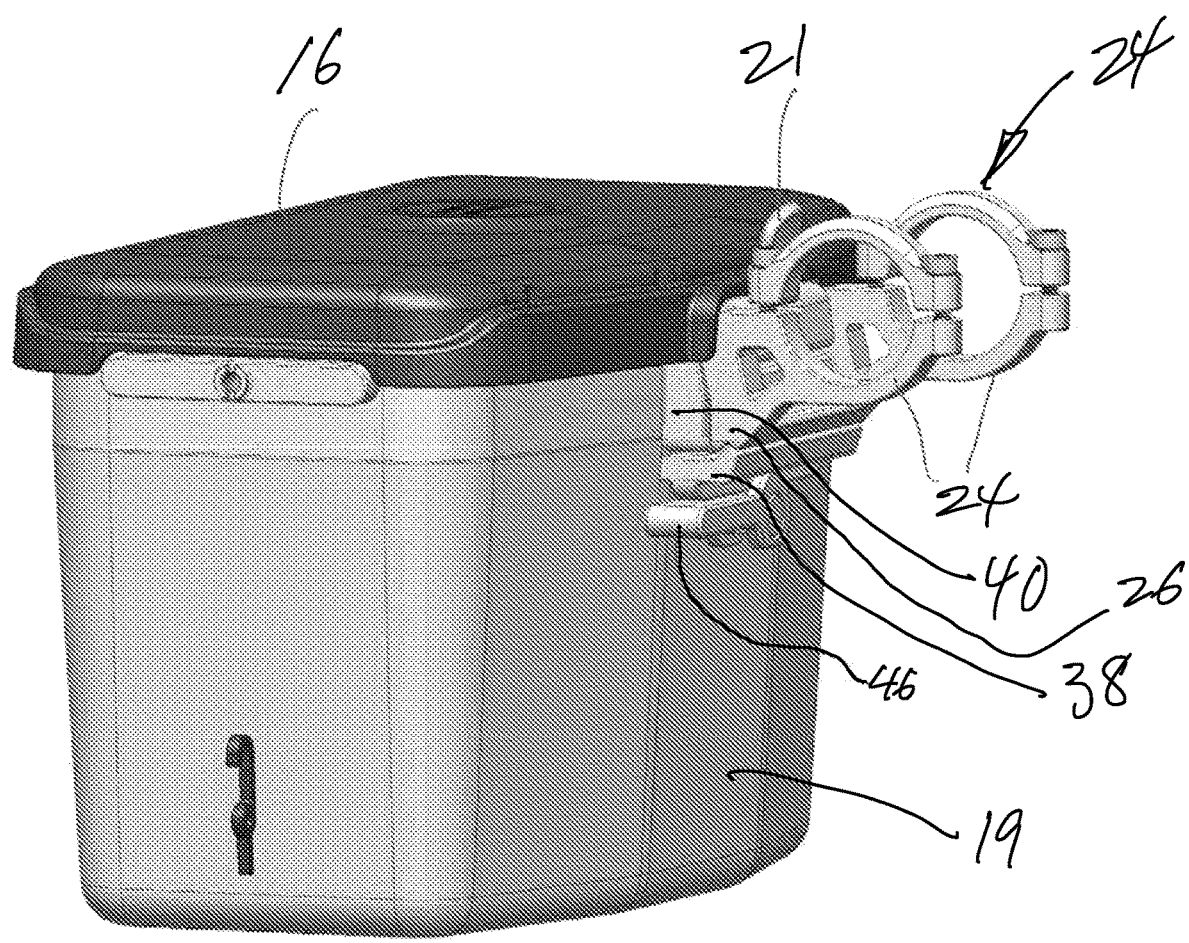
FIG. 15 is a rear perspective view of the attachment member secured to the basket with the lid closed.
Figure 16:
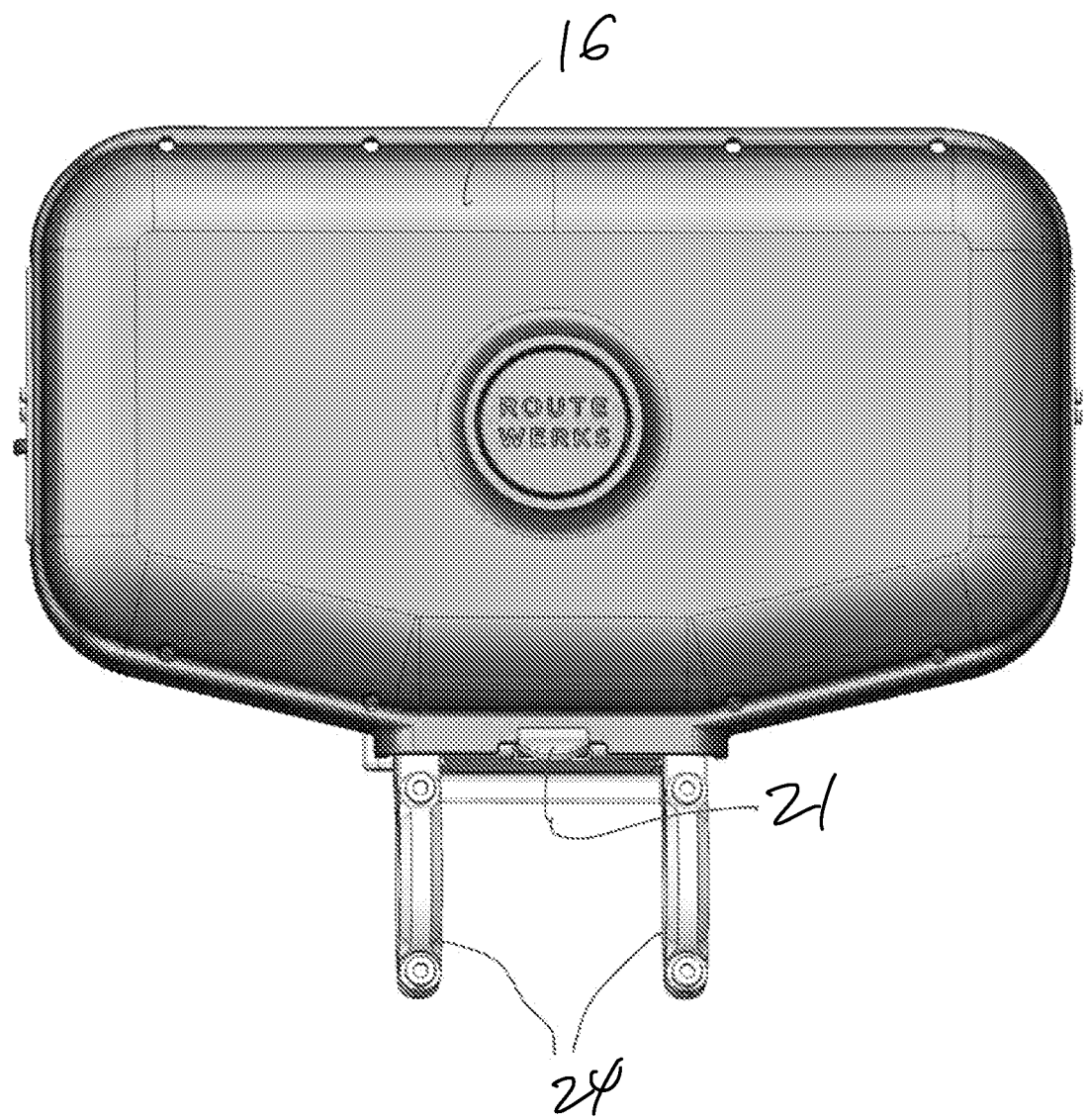
FIG. 16 is a top view of the attachment member secured to the basket with the lid closed.
Figure 17:
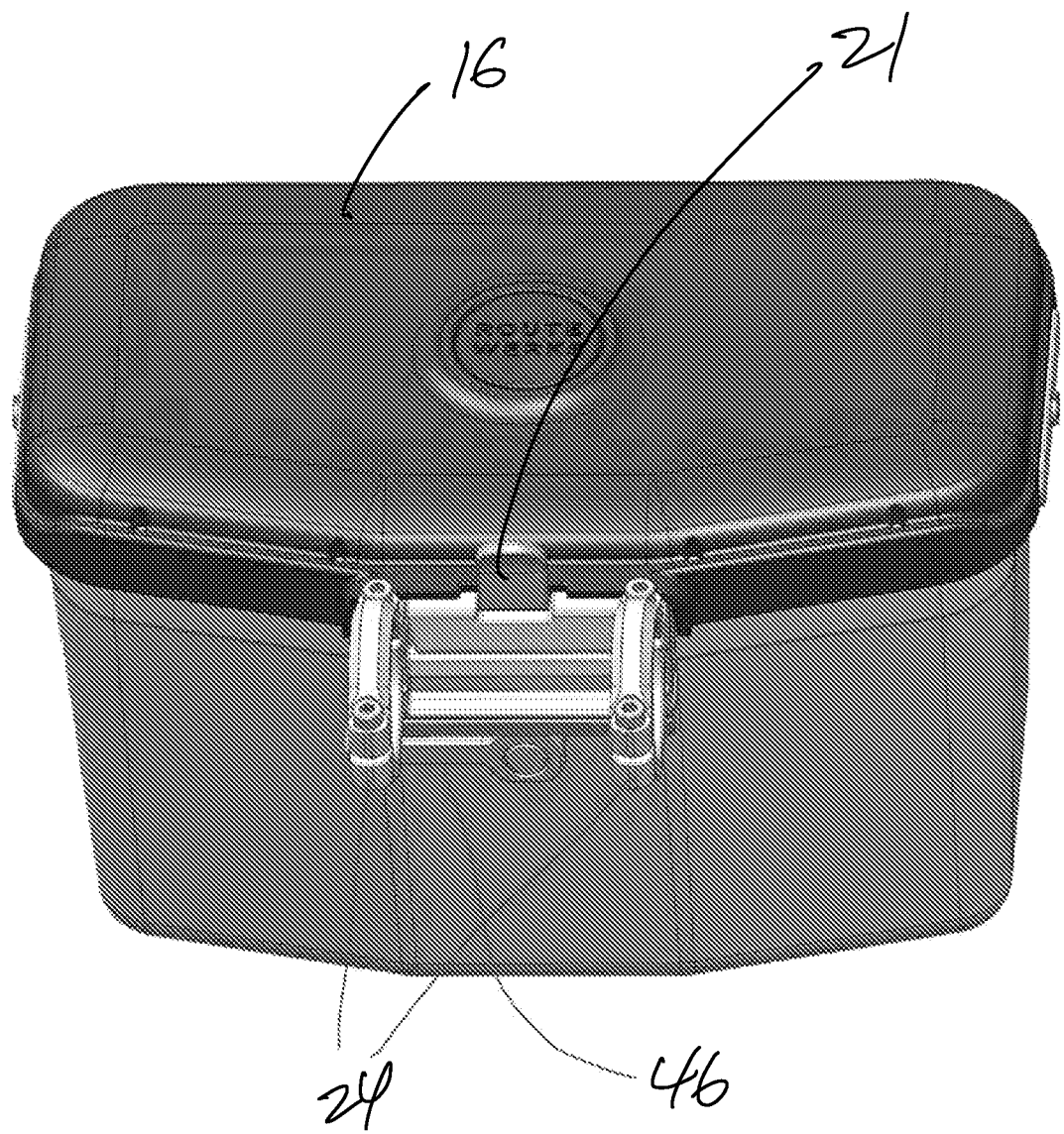
FIG. 17 is a top rear perspective view of the attachment member secured to the basket with the lid closed.
Figure 18:
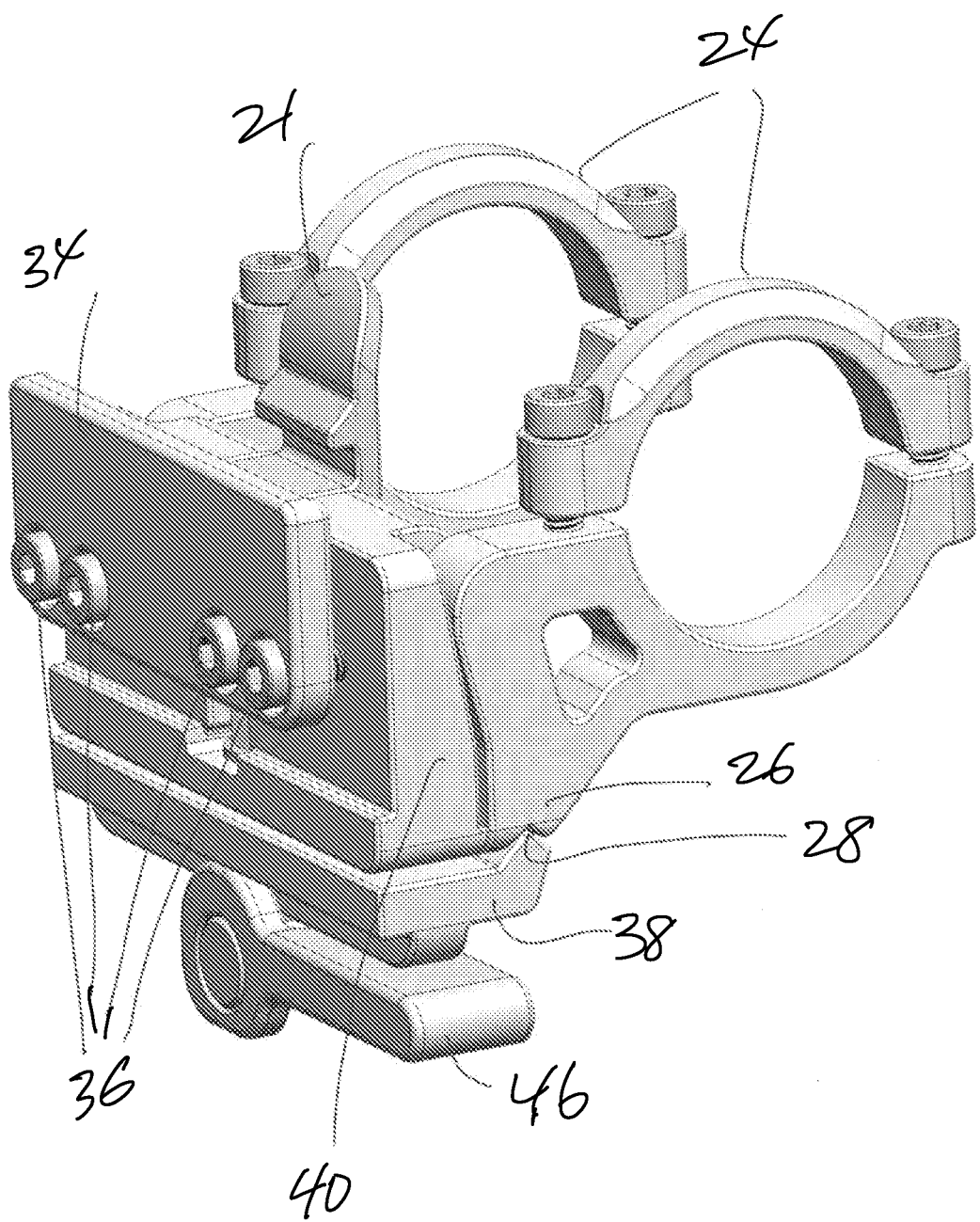
FIG. 18 shows a perspective view of the mount member secured to the basket attachment member without the basked secured thereto.
Figure 19:
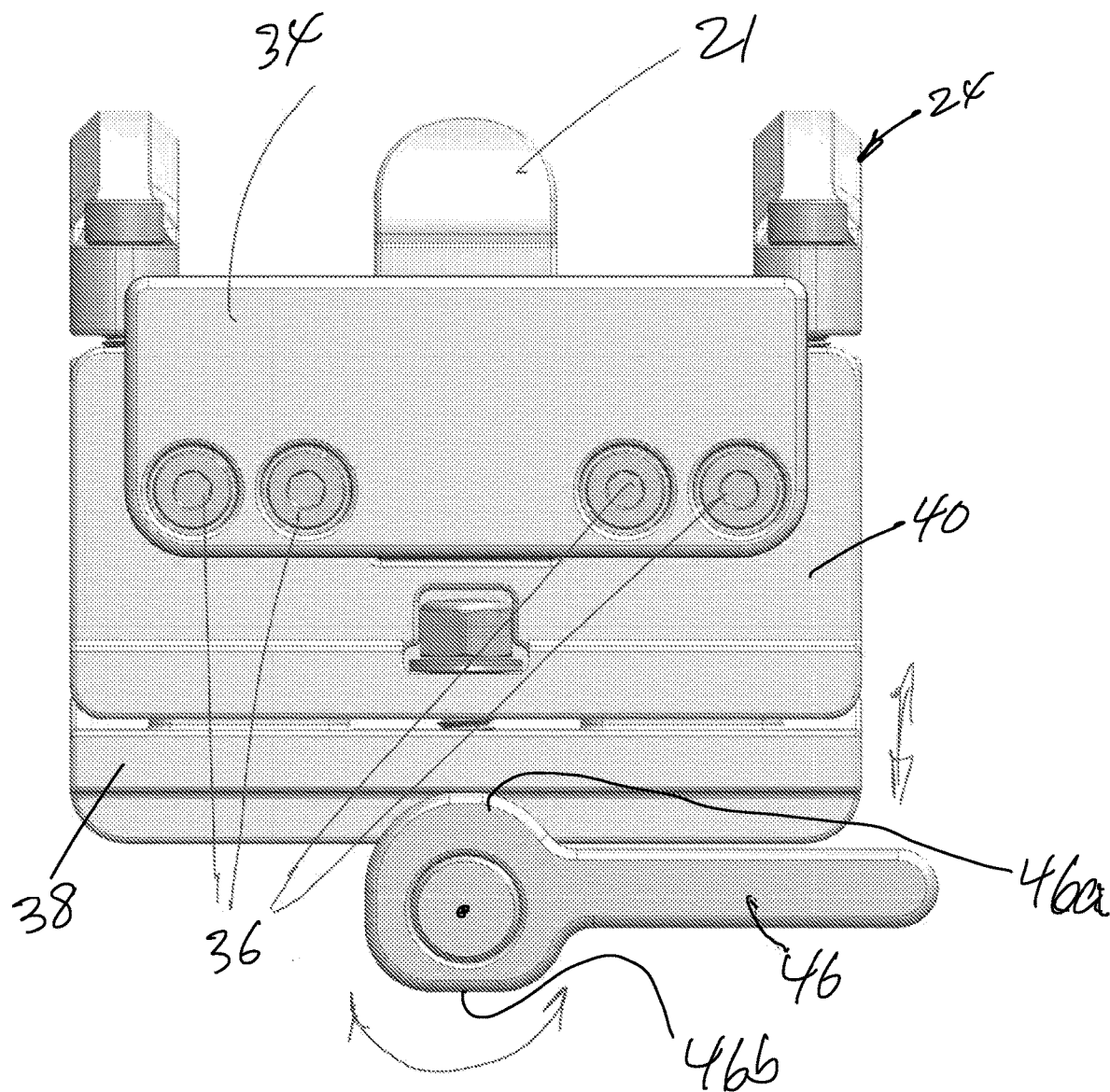
FIG. 19 is a rear elevational view of the mount member secured to the basket attachment member without the basked secured thereto.
Figure 20:
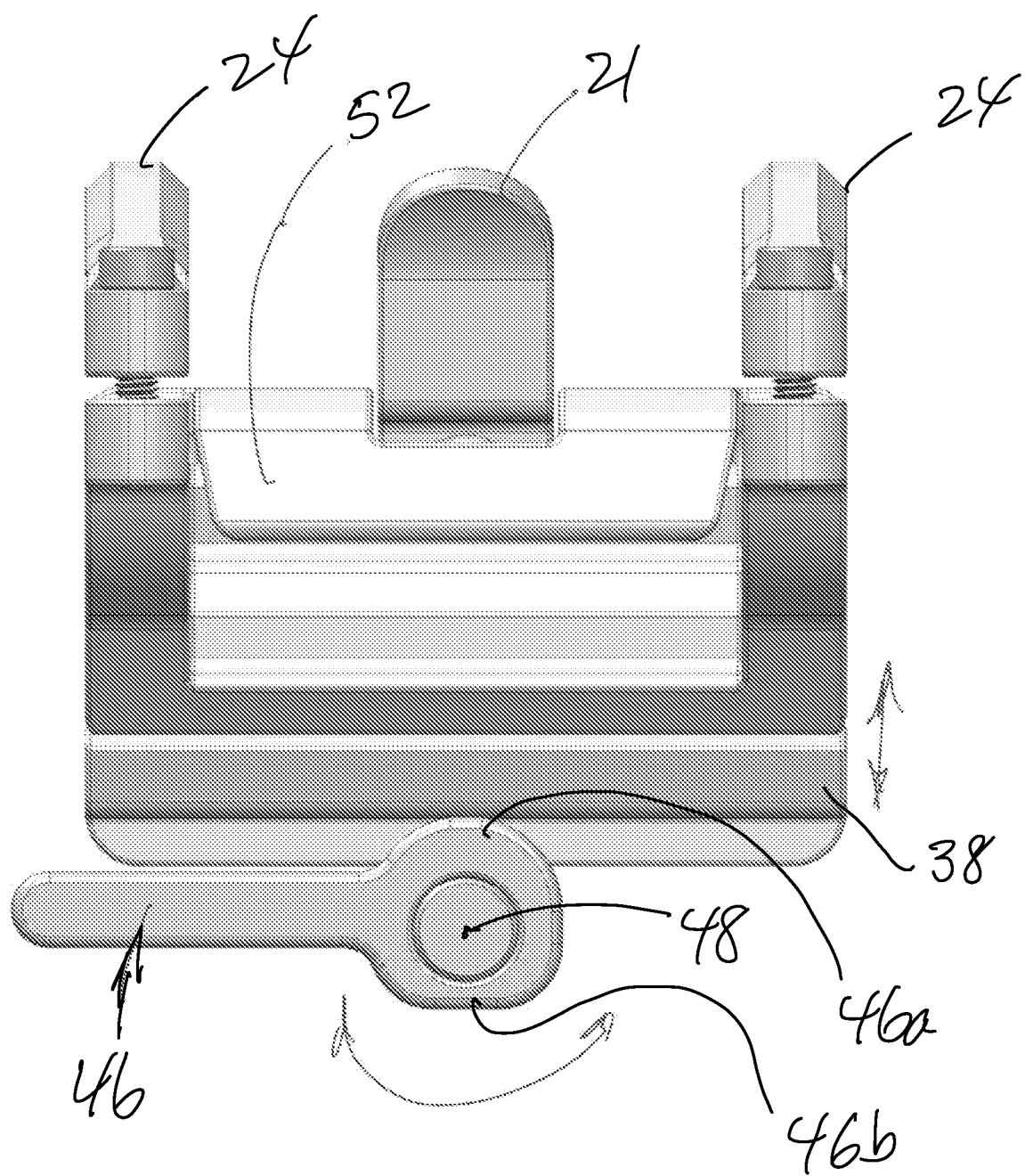
FIG. 20 is a front elevational view of the mount member secured to the basket attachment member without the basked secured thereto.
Figure 21:
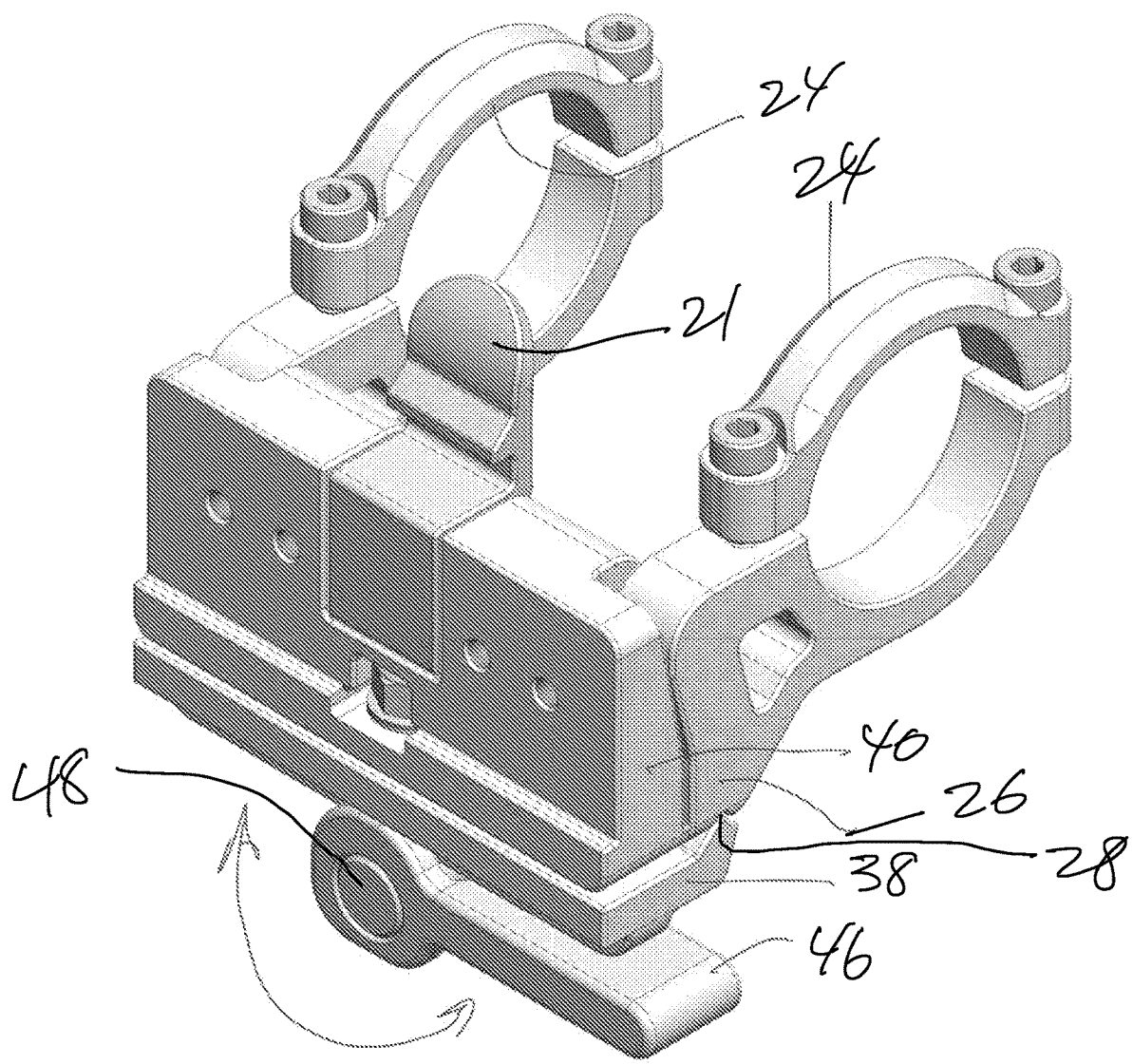
FIG. 21 shows a perspective view of the mount member secured to the basket attachment member without the basked secured thereto and connection plate removed for illustration purposes.
Figure 22:
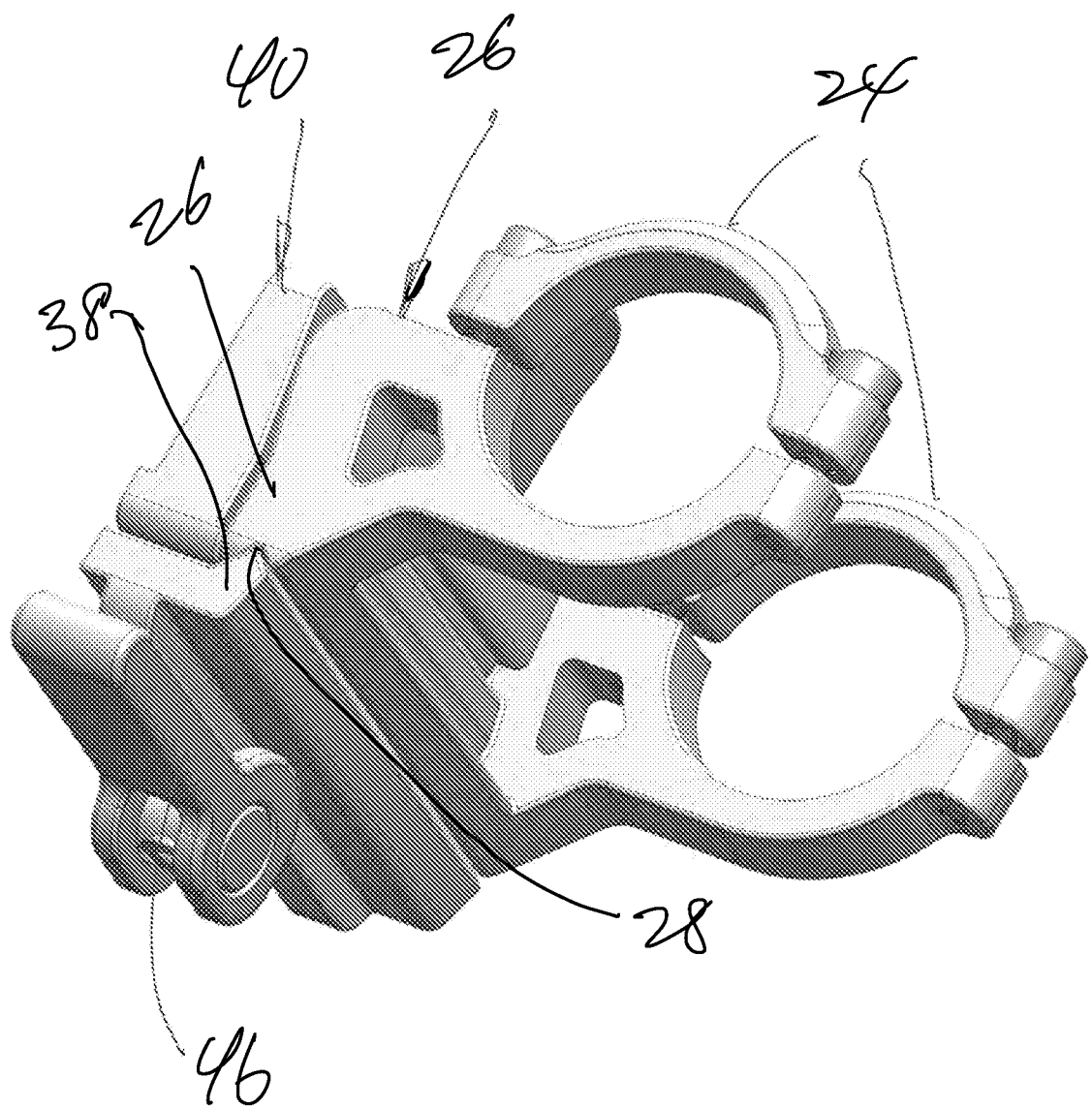
FIG. 22 is a bottom perspective view of the mount member secured to the basket attachment member.
Figure 23:
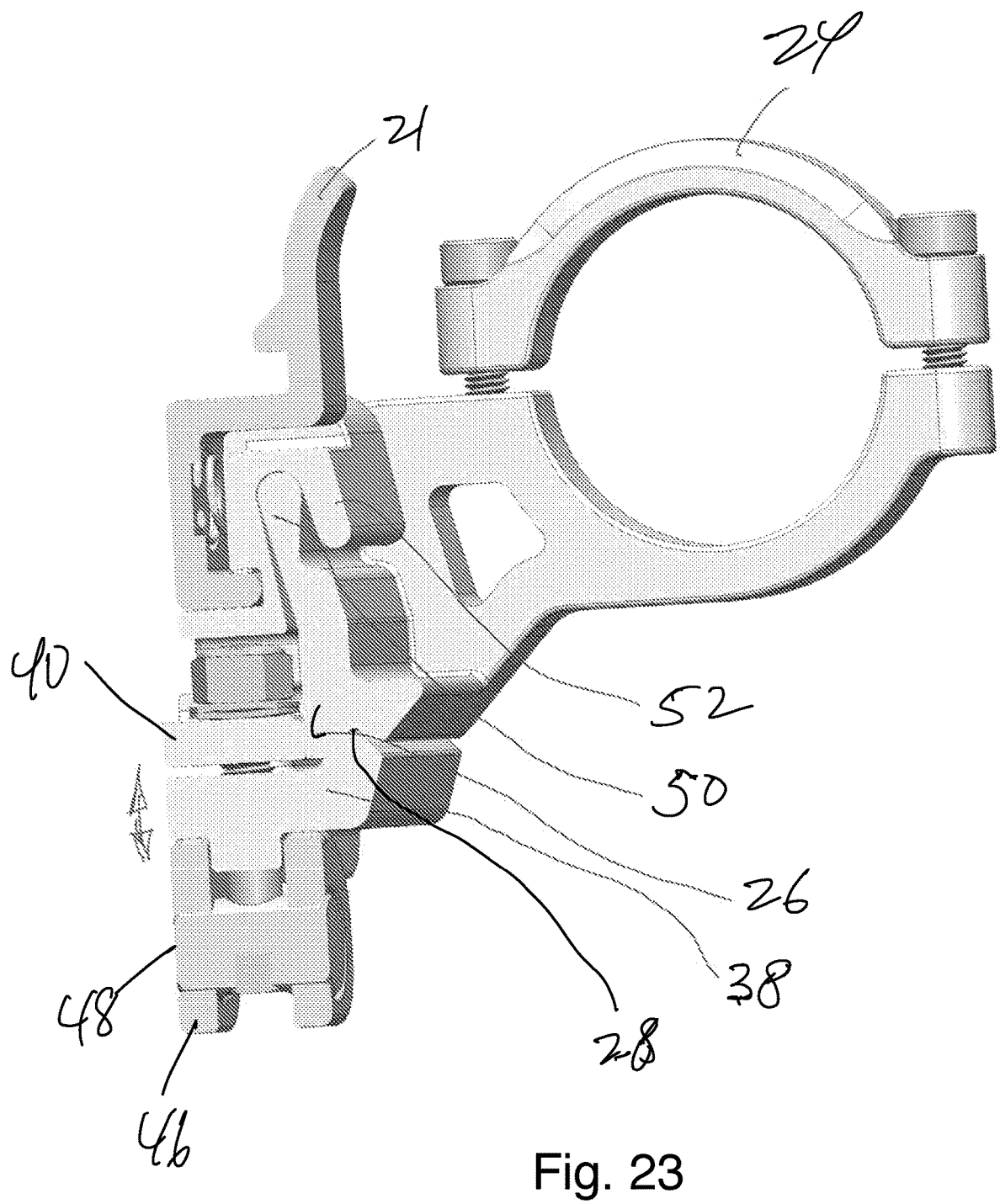
FIG. 23 is a side partial cross-sectional view of the basket attachment member secured to the mount member.
Figure 24:
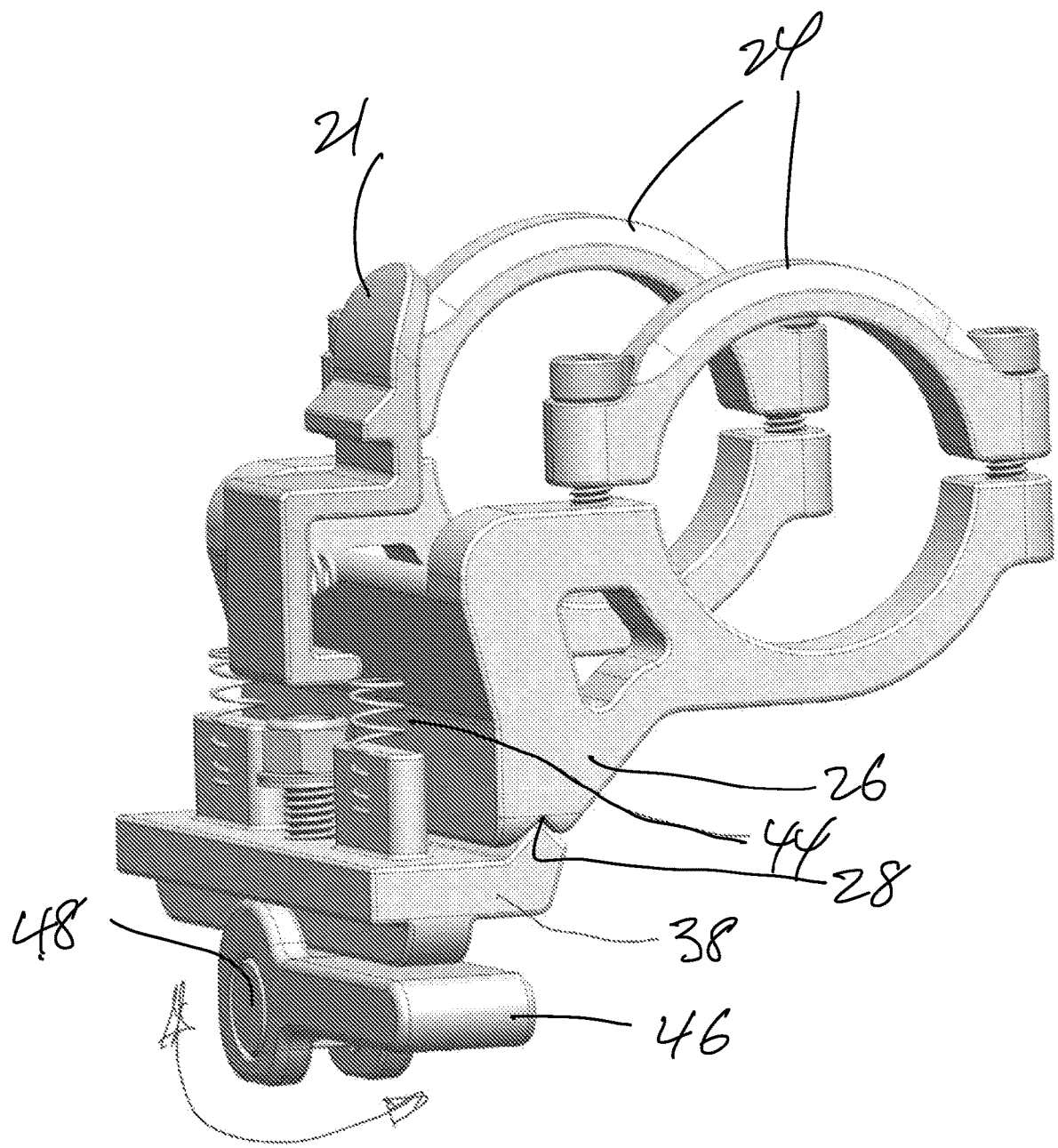
FIG. 24 is a perspective view of the basket attachment member secured to the mount member with main body of the attachment member removed to show the springs and guide bolt.
Figure 25:
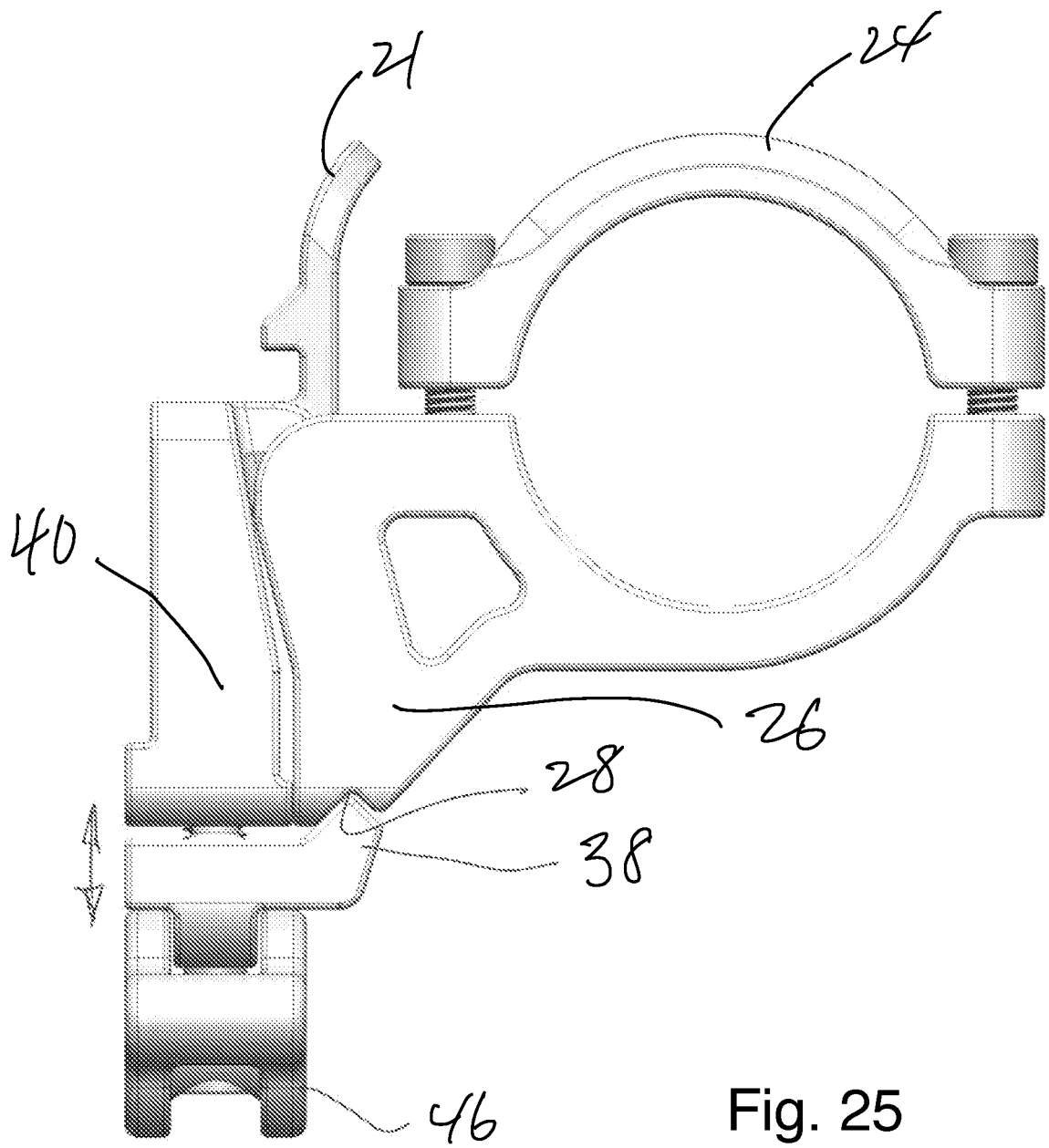
FIG. 25 is a right side elevational view showing the engagement of the lower jaw of the attachment member into the notch of the mount member.
Figure 26:
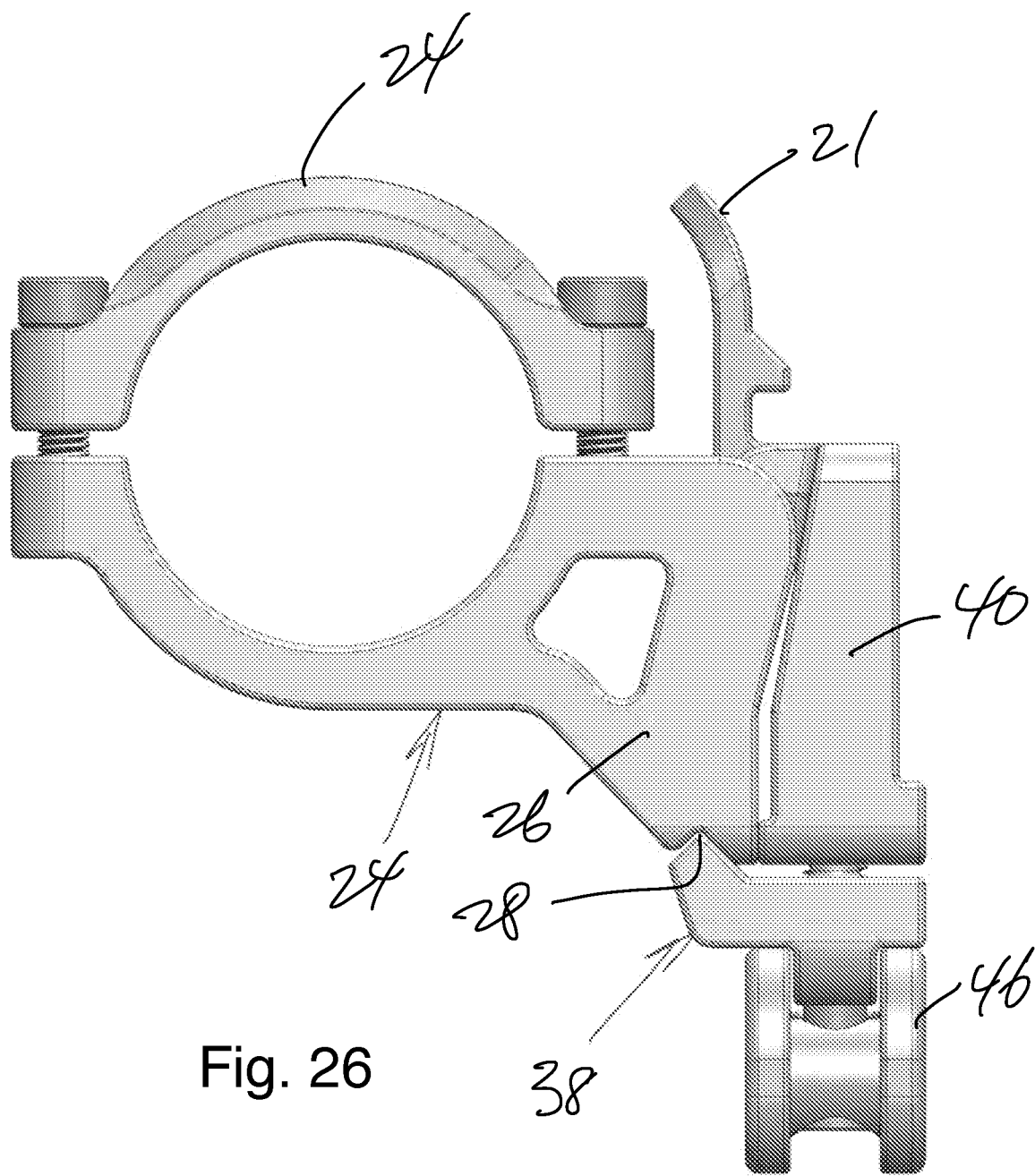
FIG. 26 is a left side elevational view showing the engagement of the lower jaw of the attachment member into the notch of the mount member.
Figure 27:
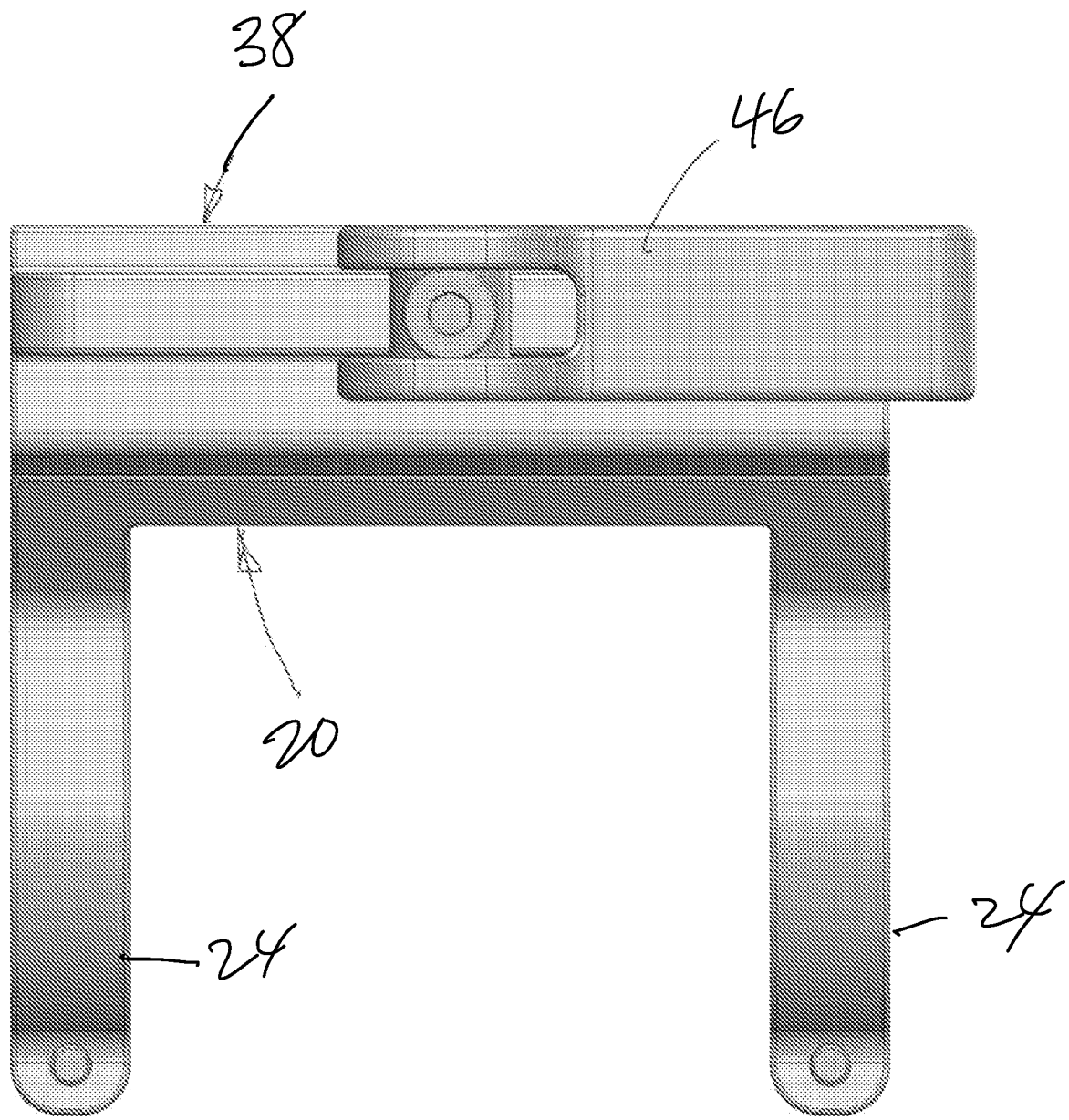
FIG. 27 is a is a bottom view of the engagement of the basket attachment member with the mount member.
Figure 28:
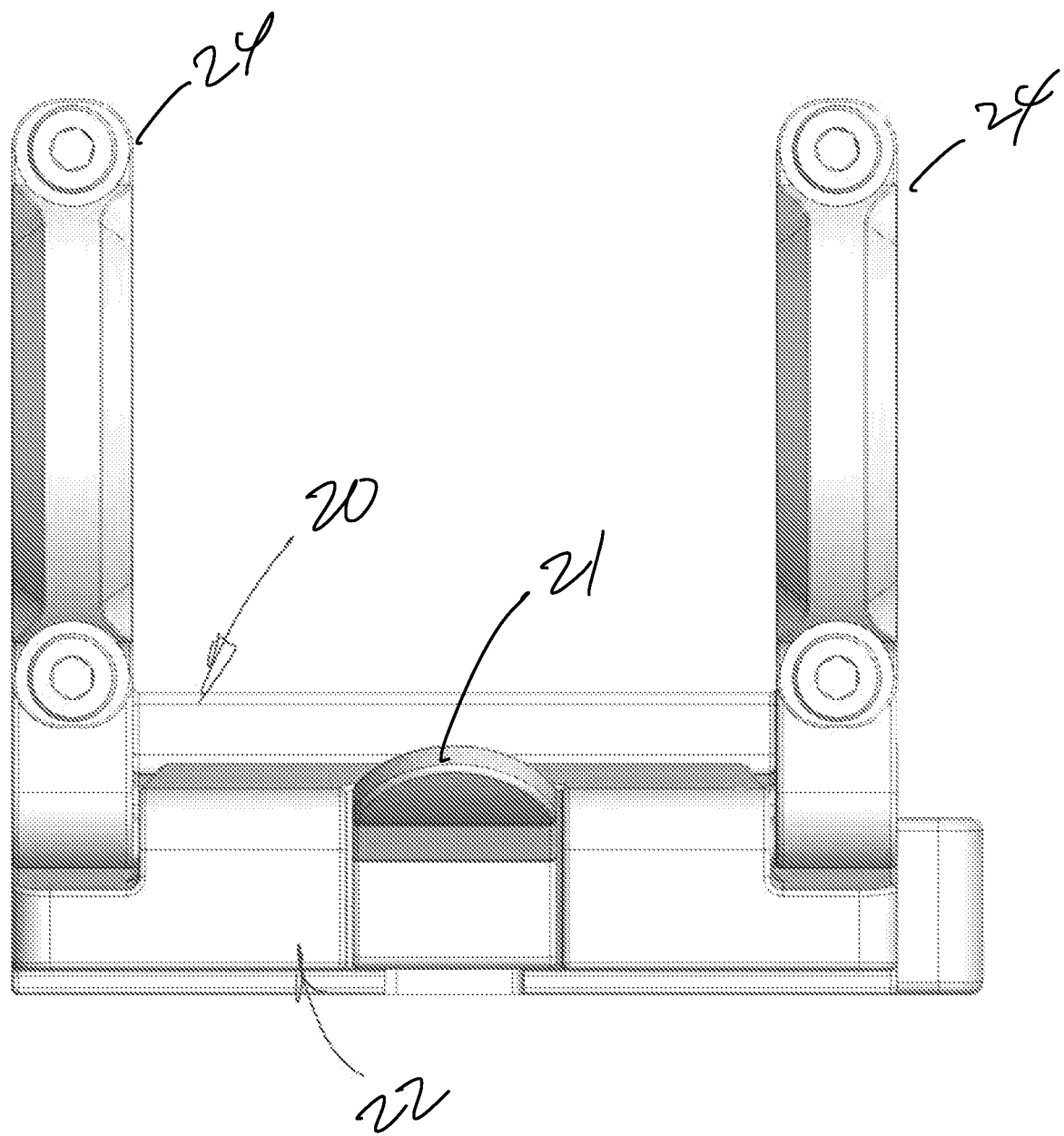
FIG. 28 is a is a top view of the engagement of the basket attachment member with the mount member.
Figure 29:
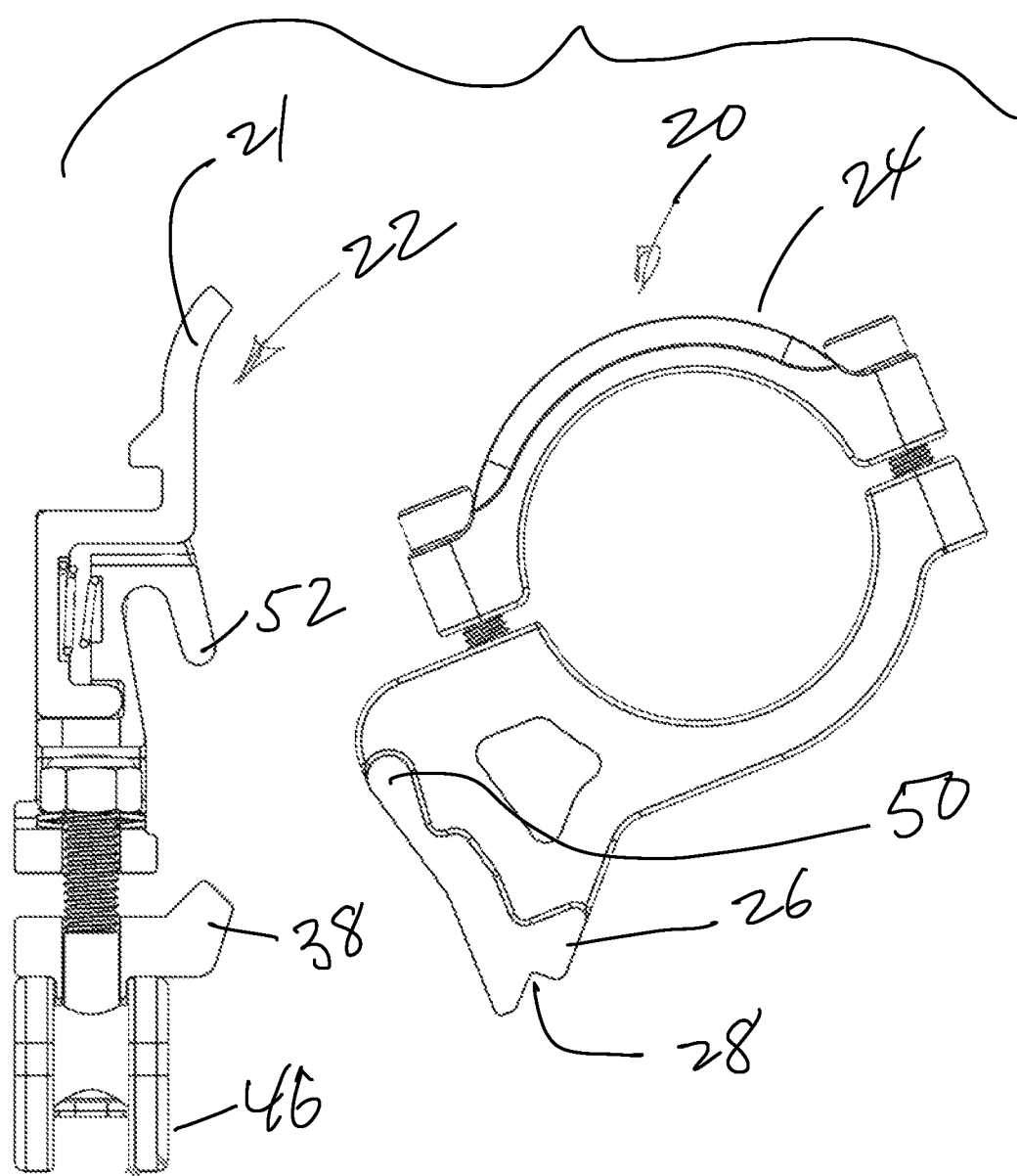
FIGS. 29-34 show the steps for engagement of the basket attachment member to the mount member.

FIGS. 14-17 show the basket attachment member 22 secured to the basket 16 and engaged with the mount member 20 and in a locked/secured condition. For ease of illustration, the handle bars 14 are not shown but, as can be understood, the clamps 24 are secured about handle bars 14, as seen in FIG. 7 above. A cam lever 46 is rotated clockwise to lock the basket 16 to the handle bars 14, namely locking the basket attachment member 22 to the mounting member 20, as seen in FIGS. 15-17. FIGS. 18-28 show additional views of the quick-release interconnect 10 for the basket embodiment, with the basket 16 removed for illustration purposes, is shown to illustrate the various components thereof. FIG. 23 shows a cross-sectional view through the quick-release interconnect system 10, while FIG. 24 shows a front perspective view, FIG. 25 shows a left side view, FIG. 26 shows a right side view, FIG. 27 shows a bottom view and FIG. 28 shows a top view.

As can be seen in the foregoing figures, the cam lever 46 rotates about a pass through pin 48 and includes a rounded portion 46a and a flat portion 46b to provide an eccentric-type engagement. The rounded portion 46a has a greater distance to the center point of rotation about pin 48 than the distance to the edge of the flat portion 46b of the cam lever 46. Thus, when the cam lever 46 is rotated to a lock position, its rounded portion 46a pushes the lower jaw 38 upwardly against the forces of the springs 44. When the cam lever 46 is rotated to an unlocked position, its flat portion 46b engages the jaw but, due to its reduced distance to the center rotation point, the jaw 38 remains loose thereby allowing the attachment member 22 to be separated from the mount member 20 for detachment of the basket 16 from the handle bars 14.

Thus, the present invention includes a mount member 20 that includes a cleat 26 and a top hanger seat 50. A clamp member 24 is connected to the mount member 20 so it can be securely and preferably non-releasably connected to handle bars 14 of a bicycle 64. A lower jaw 38 is spring-biased into an open condition by springs 44 so it can be secured closed by the cam lever 46. An upper jaw hanger 52 is also provided to permit the attachment member 22, and basket 16 attached thereto, to be hung on the top hanger seat 50 while the basket attachment member 22 are oriented in place.

FIGS. 29-34 show the installation, removal and use of the quick-release interconnect system 10 of the present invention for securing a basket 16 to handle bars 14 of a bicycle 64. FIGS. 9-11, for example, show the basket attachment member 22 secured to the basket 16 to be mounted to the mount member 20, which is attached to the handle bars 14. The cam lever 46 is shown in a locked condition with the lower jaw 38 in an upward locked position against the forces of the springs 44. In FIG. 12, the lower jaw 38 is removed for illustration and explanatory purposes. In FIG. 13, the lower jaw 38 is shown but the main body 40 of the attachment member is not shown for illustration purposes.

The springs 44, for spring-biasing the lower jaw 38 downwardly to an open position, can be easily seen.

Figure 30:
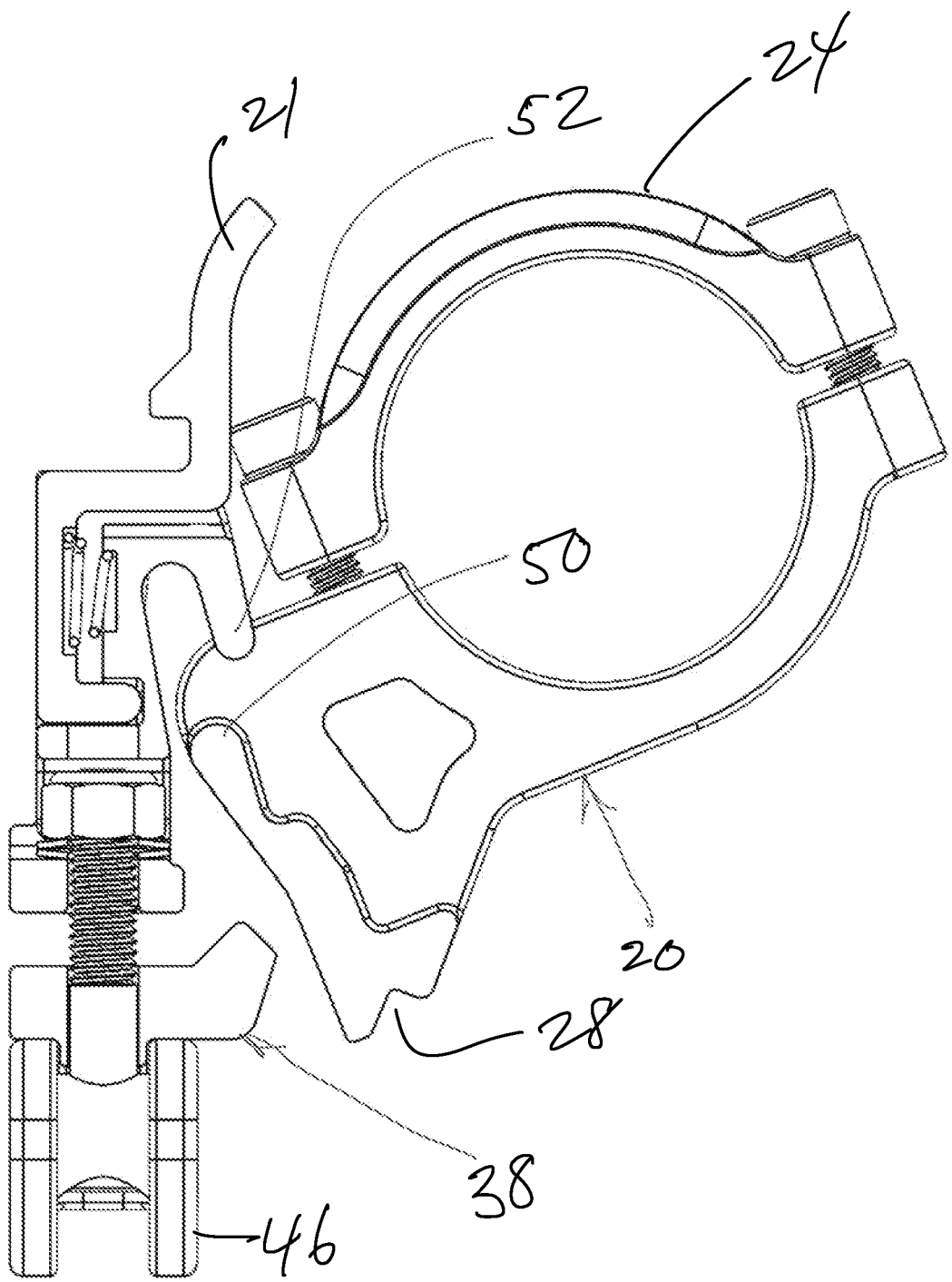
Figure 31:
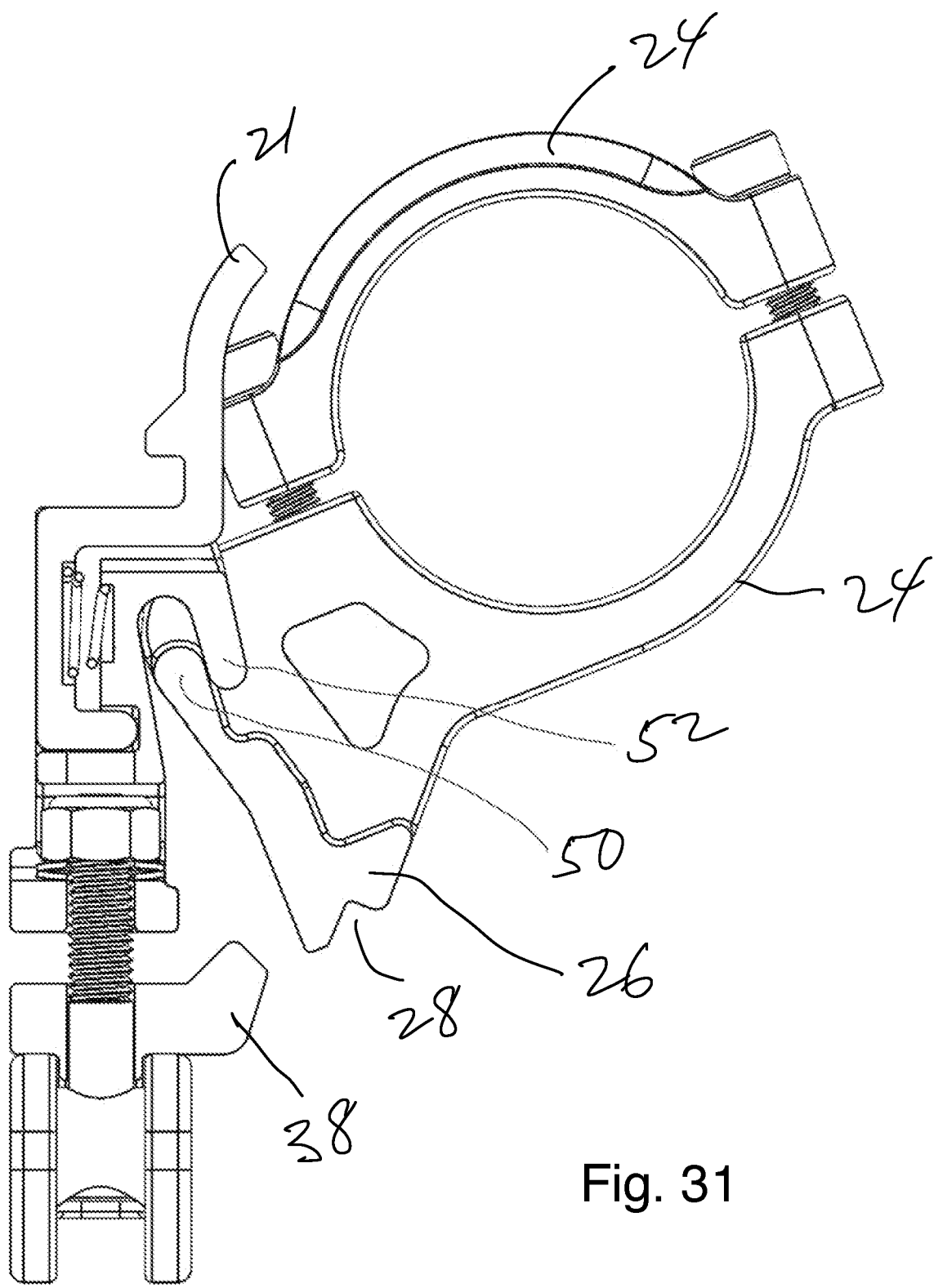
Figure 32:
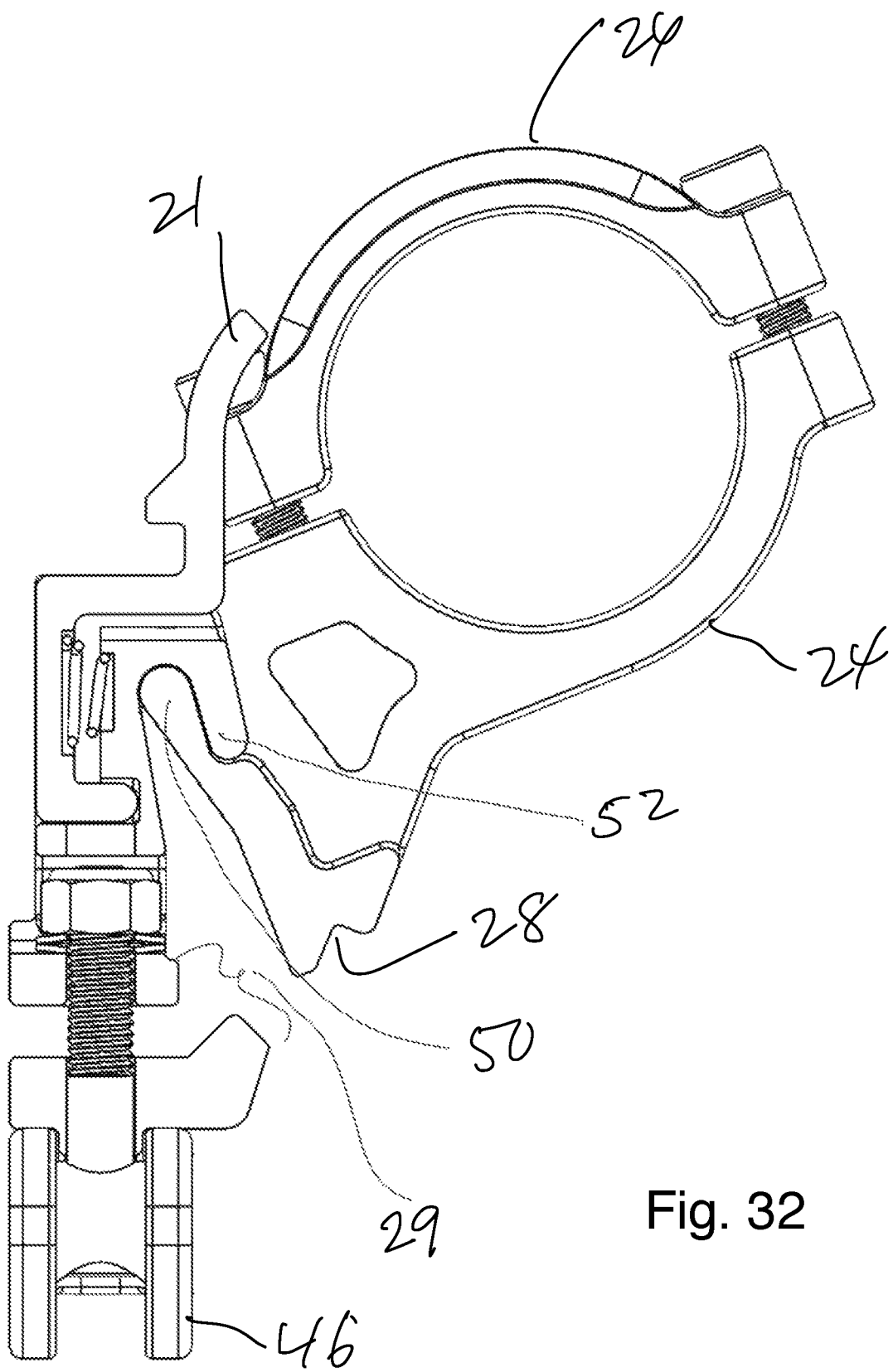

In use, as in FIGS. 29-34, the attachment of the basket 16 to the handle bars 14, using the quick-release interconnection 10 of the present invention, is shown. In FIG. 30, the upper jaw hanger member 52 of the basket attachment member 22 (with basket attached thereto but not seen in FIGS. 29-34) is first located over the top hanger seat 50. Then, as in FIGS. 31-33, the attachment member 22 is rotated in place so the lower jaw 38, being spring-biased in an open condition by integrated springs 44, is aligned with the cleat 26, namely, a notch portion 28 thereof. The basket 16 and attachment member 22 can be released by the user and the lower jaw 38 will remain aligned with the cleat 26 and its notch 28, as in FIG. 33. This avoids the user of having to hold the basket 16, which could be heavy, during the process of securing the quick-release interconnect 10. Then, as in FIG. 34, against the forces of the integrated springs 44 in the attachment member 22, the cam lever 46 is rotated clockwise to thereby clamp the lower jaw 38 into communication with the cleat portion of the mount member 20, with the assistance of the notch 28 thereof, to secure the attachment member 22, with basket 16 or other object attached thereto, securely to the mount member 20. The condition of the cam locking can also be seen in FIG. 20, for example.

Figure 33:
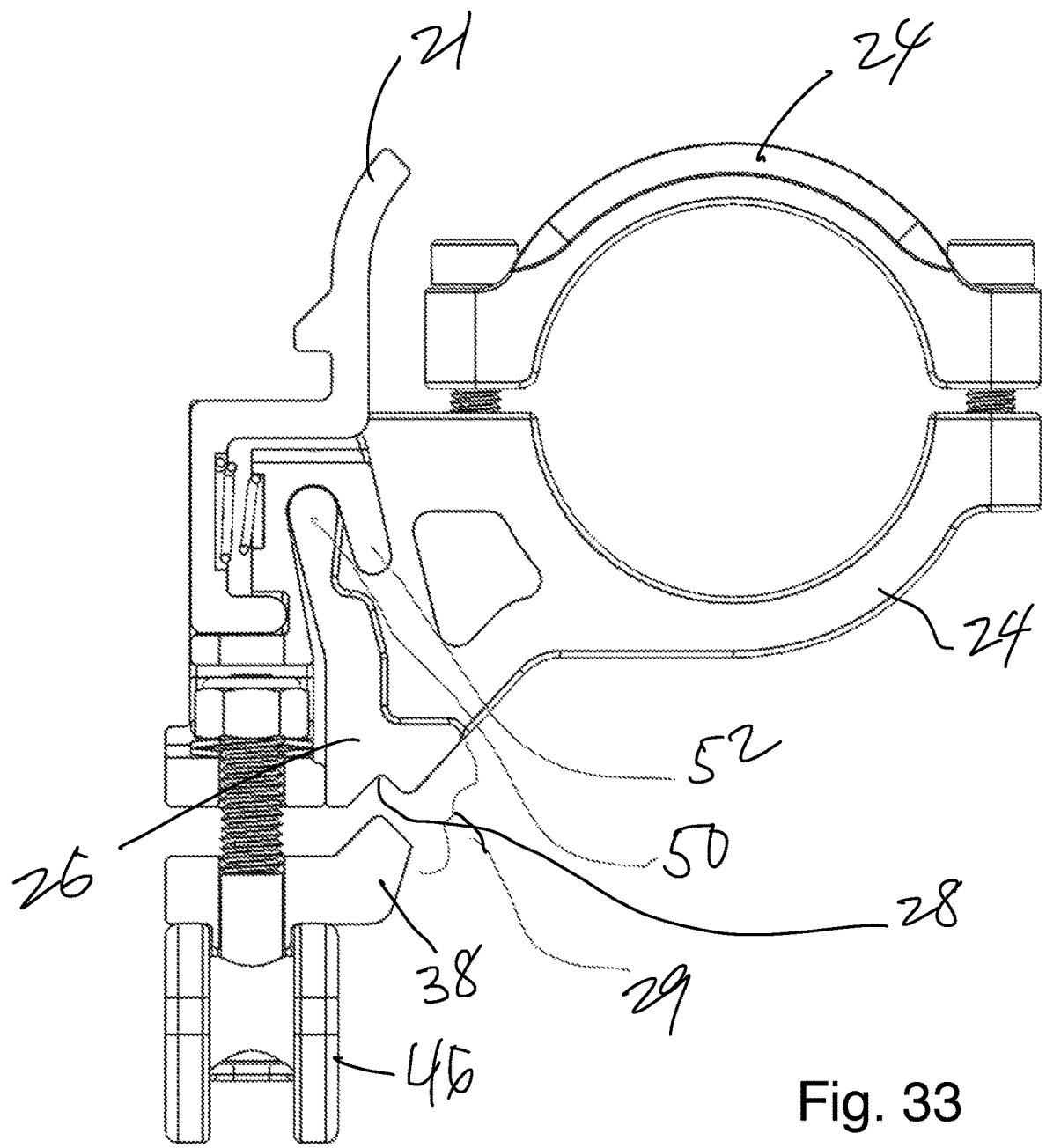
Figure 34:
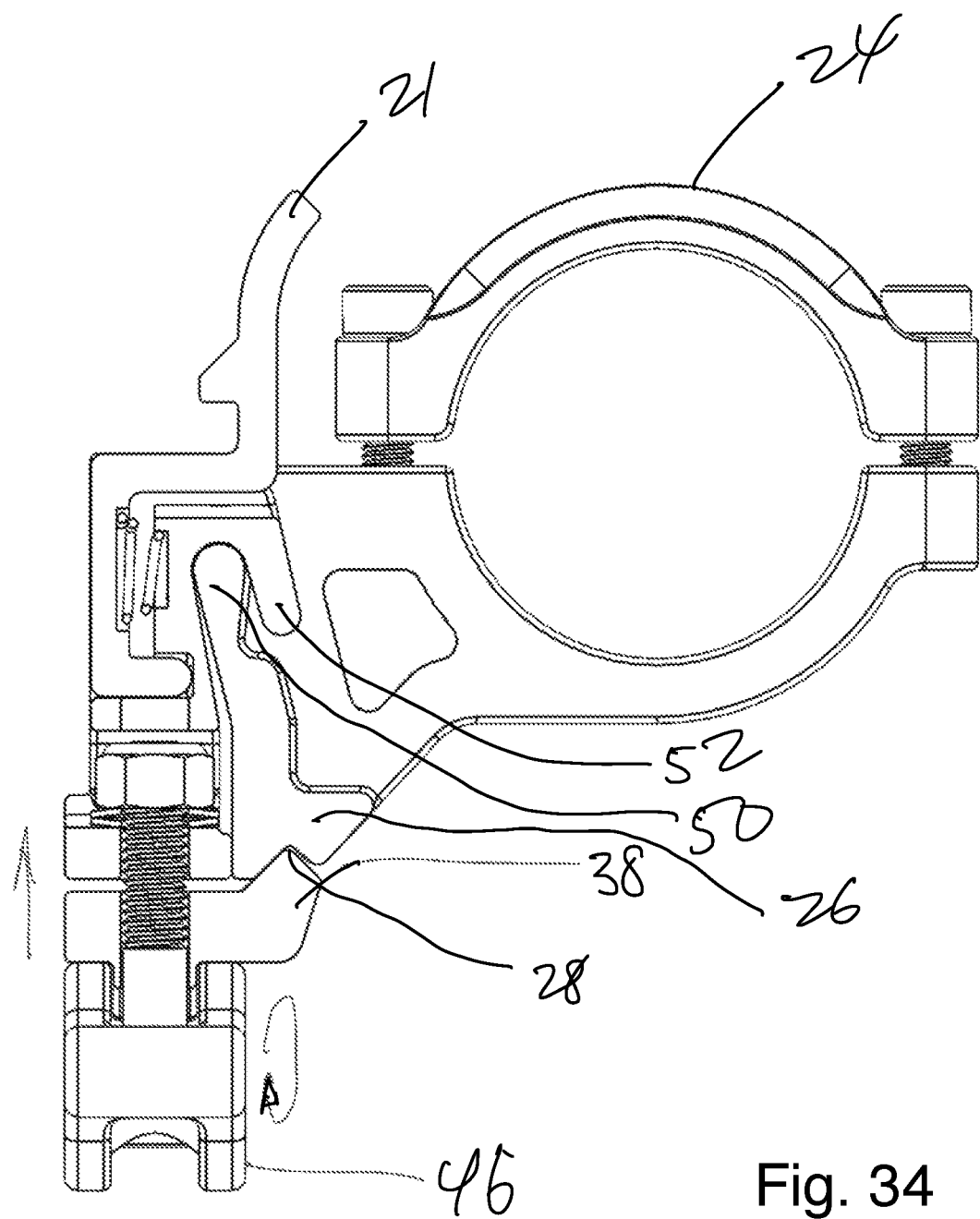
Figure 35:
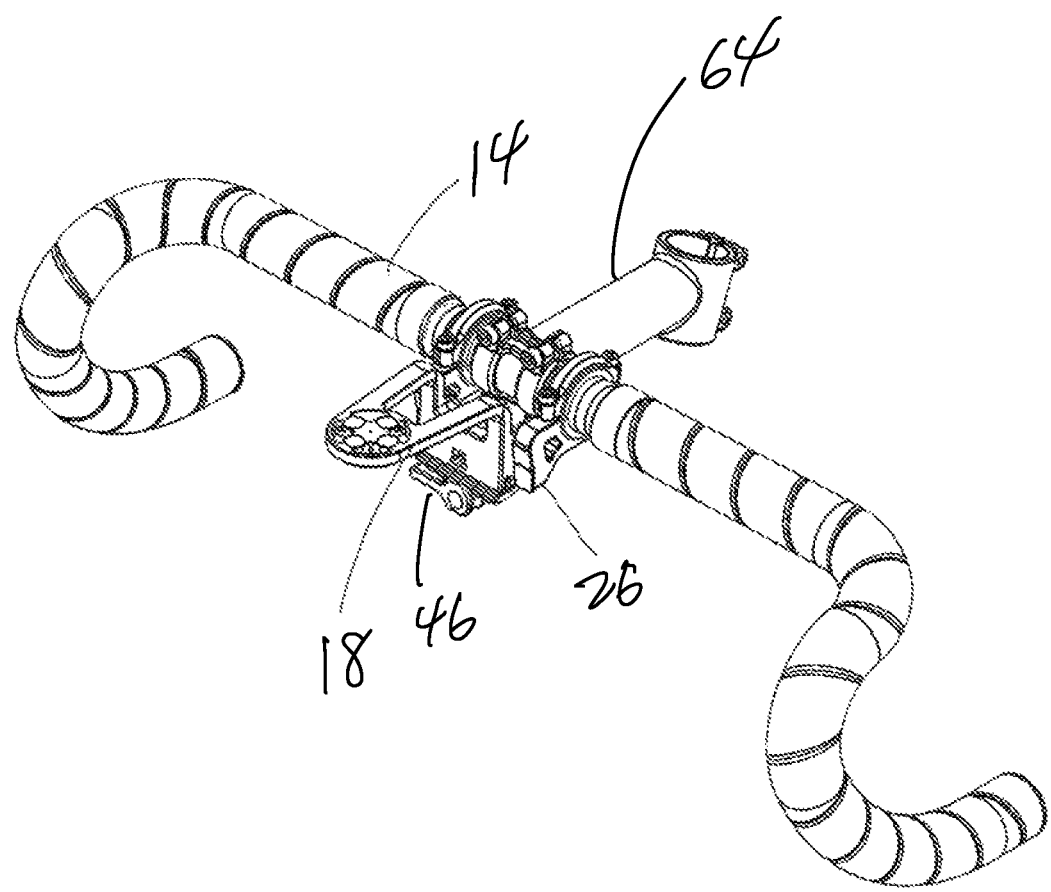
FIG. 35 shows a front perspective view of an alternative embodiment of the invention with an accessory attachment member secured to the mount member.

It should be noted that, to remove the basket 16 from the handle bars 14, the process is reversed. Namely, the cam lever 46 is rotated in a counterclockwise direction to release the lower jaw 38 from the cleat 26 of the mount member 20. The integrated springs 44 on the attachment member 22 spring-biases the lower jaw 38 open in a downward direction to separate and release it from the cleat 26 to provide a gap 29 as shown in FIG. 33. The springs 44 also assist in maintaining the lower jaw 38 open after the basket 16 has been detached from the handle bars 14. Then, the attachment member 22, and basket 16 or other object attached thereto, are rotated up and away from the cleat 26 to clear the opened lower jaw 38 from the cleat 26 to release the basket 16 from the handle bars 14.

Figure 36:
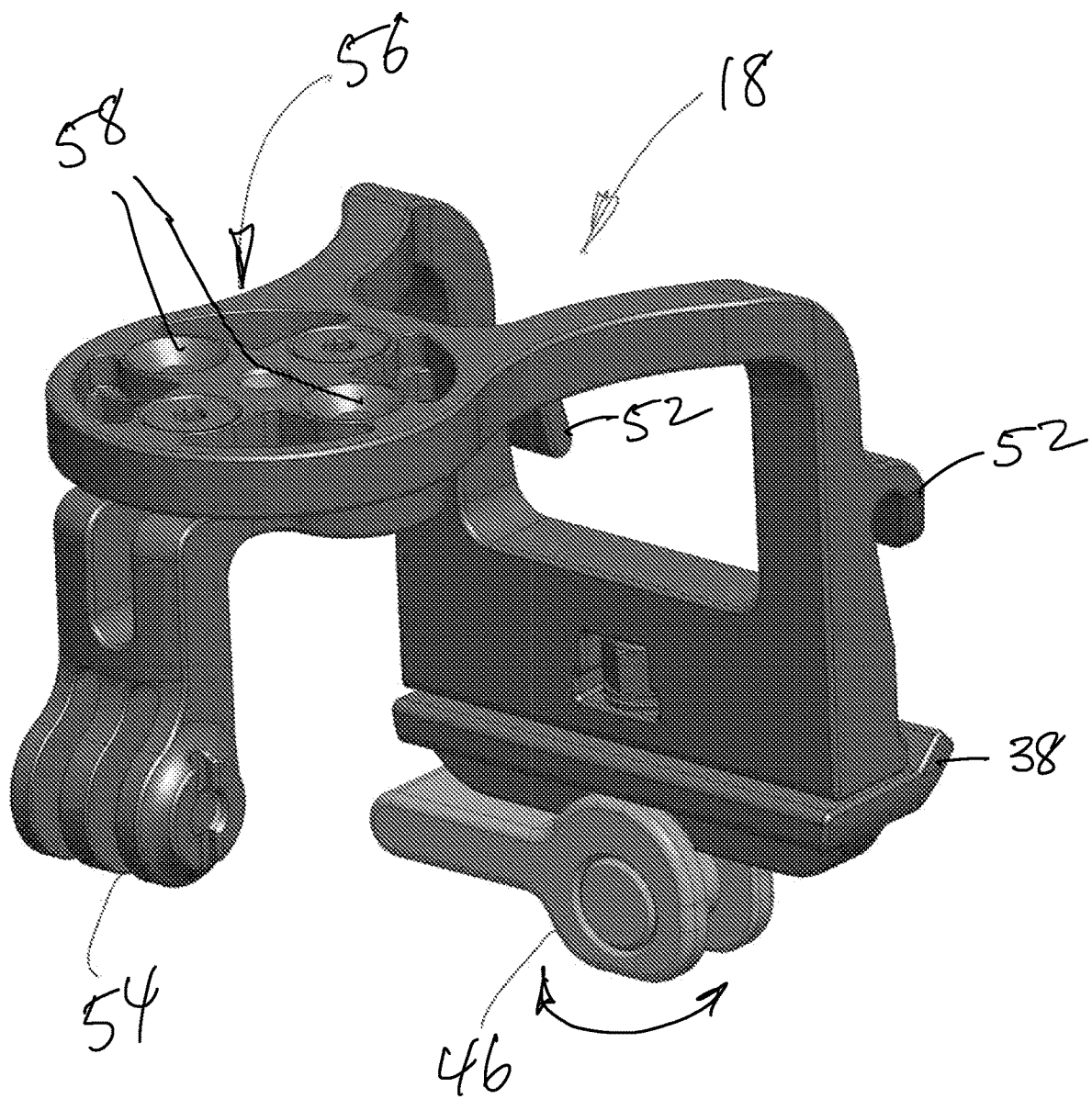
FIG. 36 shows a front perspective view of the accessory attachment member.
Figure 37:
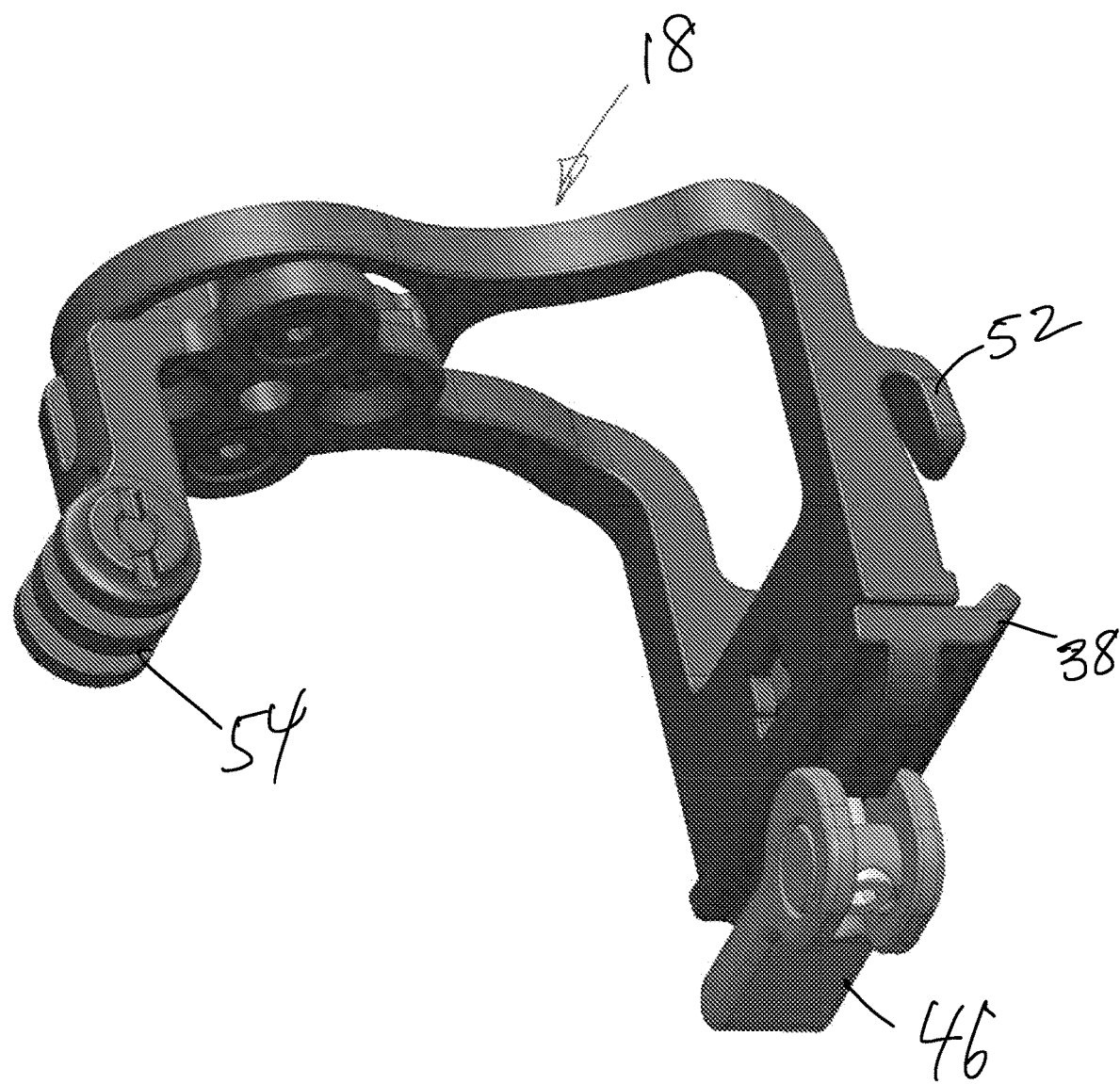
FIG. 37 shows a bottom perspective view of the accessory attachment member.
Figure 38:
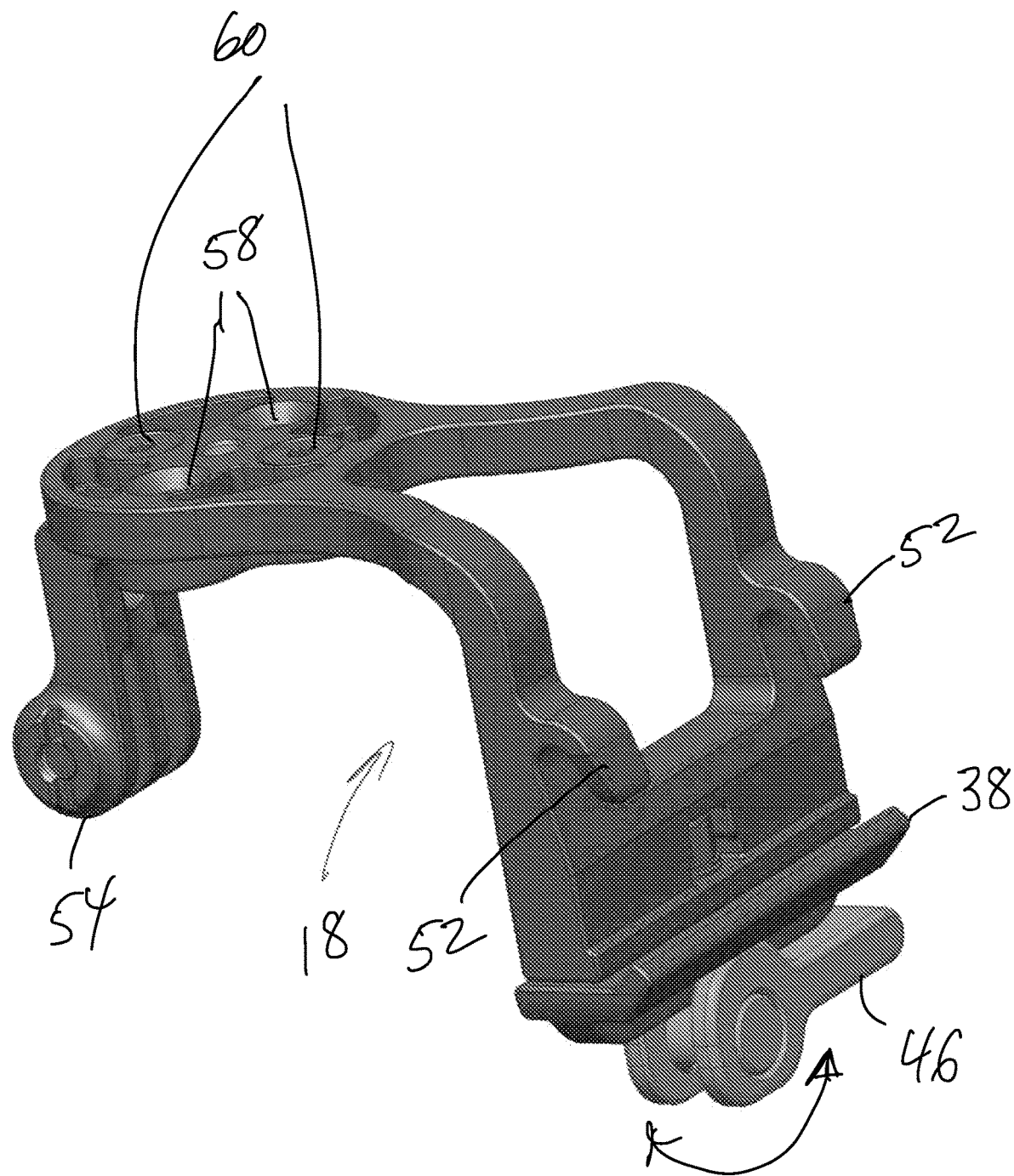
FIG. 38 shows a rear perspective view of the accessory attachment member.

FIGS. 35-38 show an alternative embodiment of the present invention where the attachment member 18 accommodates an accessory 54 instead of a basket 16. Similar structures, such as the cam lever 46 use the same reference numerals for ease of illustration. The accessory attachment 18 is releasably secured to handle bars 14 instead of the basket attachment member 22. The accessory attachment member 18 is similar to the basket accessory attachment 22 member but does not include a connection plate 34 to attach to a basket 16 or other structure but rather an accessory interface with a, preferably, universal mount configuration 56. For example, as seen in FIGS. 36-38, pass through holes 58 are provided in a standard hole pattern whereby components may be attached thereto, such as a camera mount. Thus, fasteners 60 are threaded through the holes 58 to secure the component 54. As a result of this second embodiment, a camera mount 54 or other accessory, such a light source, fan, or the like, can be releasably connected to the handle bars 14 of a bicycle 64 using the quick-release interconnect 10 of the present invention.

FIGS. 39-44 show the installation, removal and use of the quick-release interconnect system 10 of the present invention used for securing an accessory mount 18 to handle bars 14 of a bicycle 64. The primary components are the same as the basket accessory mount 22, such as the lower jaw 38 and hanger 52 and hanger seat 50 but they can be modified to suit the accessory mount 18 at hand. The process for attaching and removing the accessory mount 18 is the same as the basked attachment 22 as well. For example, the accessory mount 18 can include a universal mount pad 56 with various connection interfaces, such as pass through holes 58, which can be seen in FIGS. 39-44. A camera mount interface 54 can be provided and attached to the universal mount pad 56 to receive a sports camera.

Figure 39:
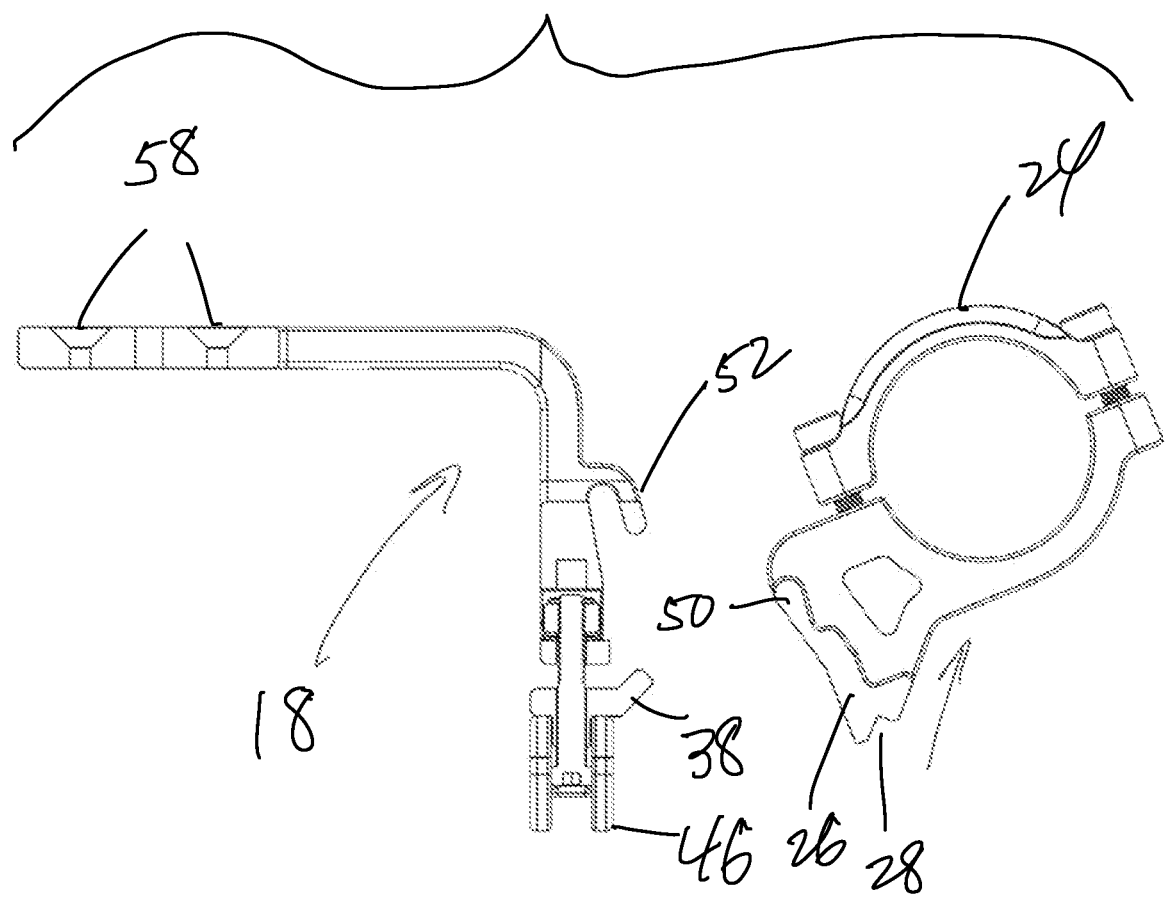
FIG. 39-44 shows the steps for engagement of the accessory attachment member to the mount member.
Figure 40:
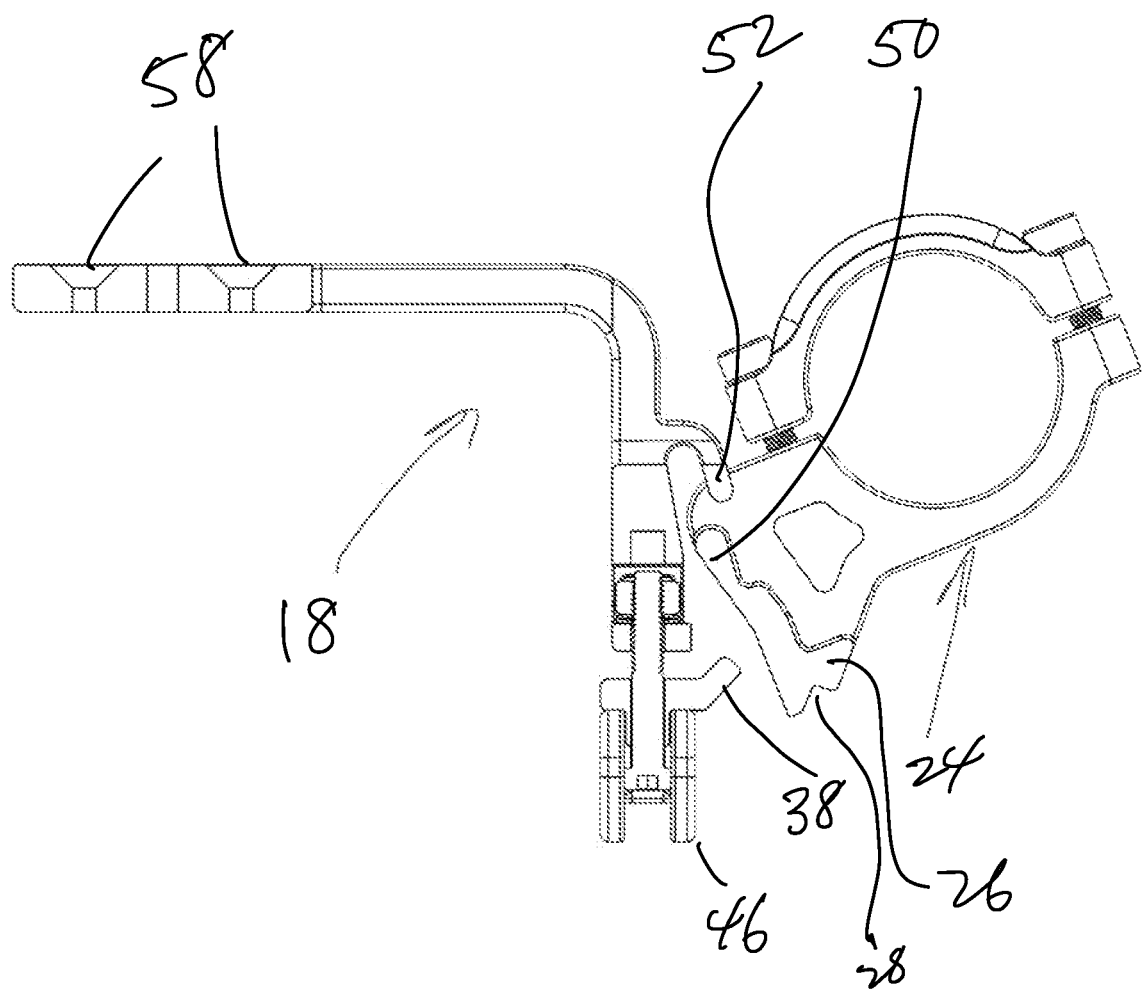
Figure 41:
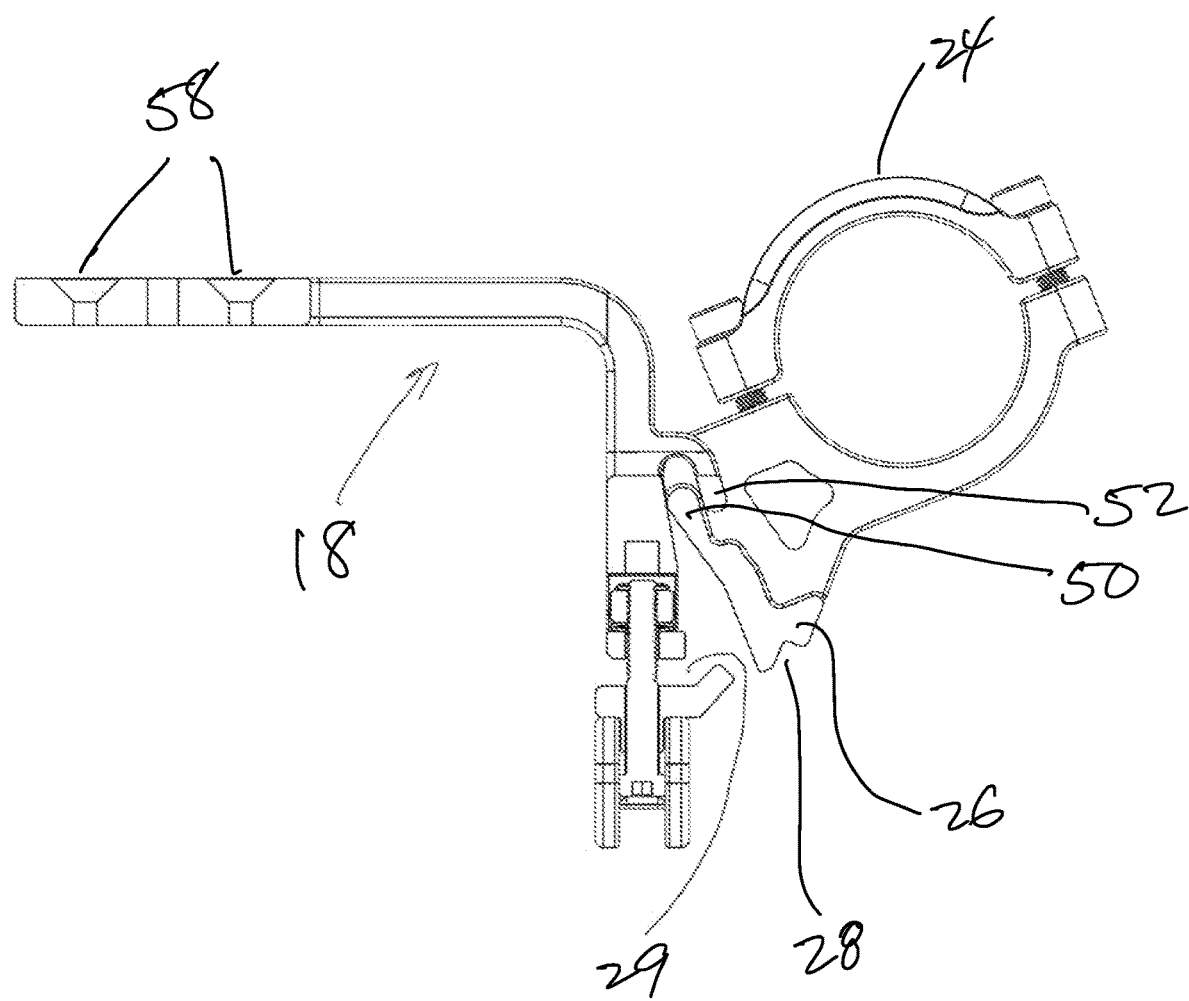
Figure 42:
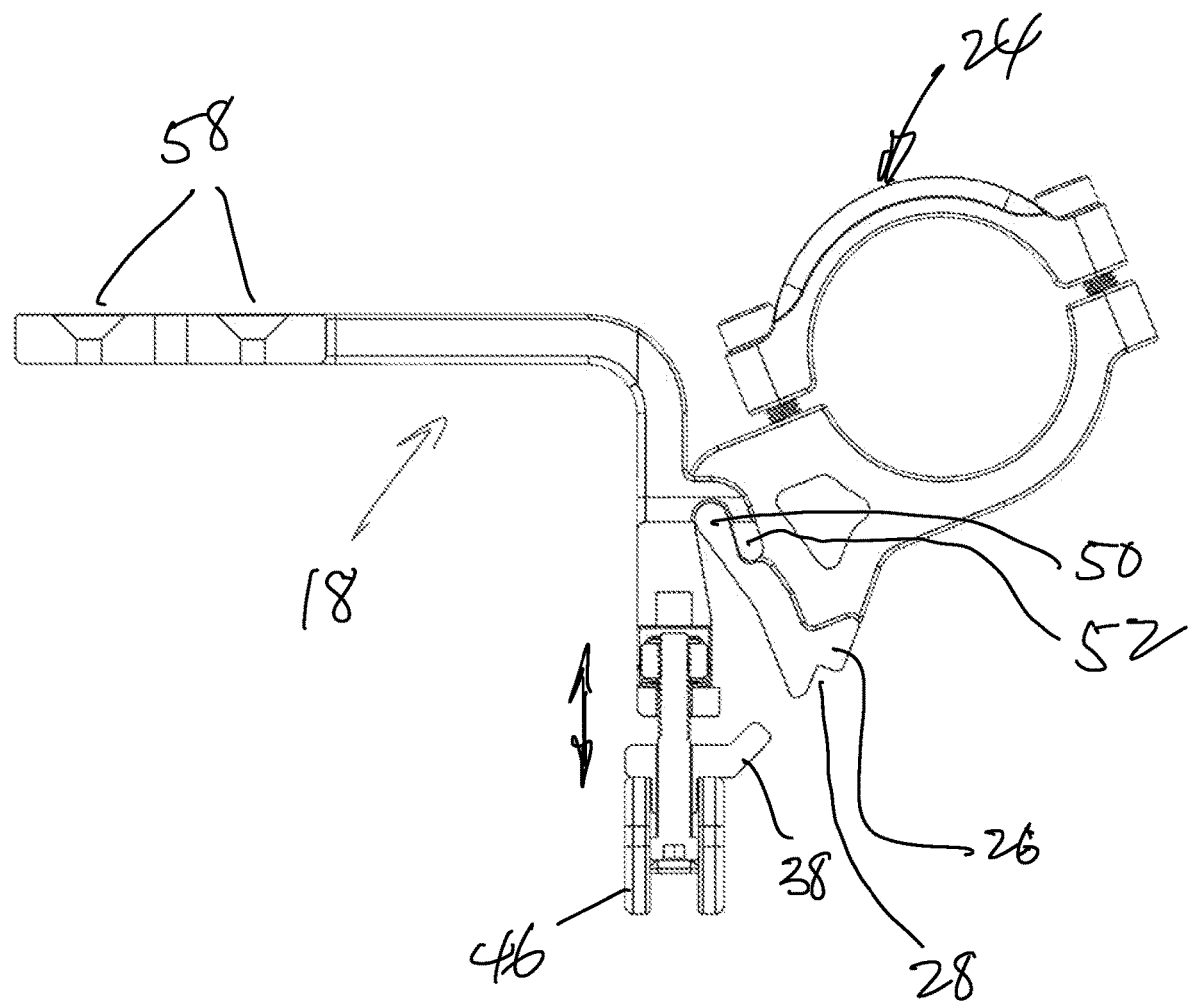
Figure 43:
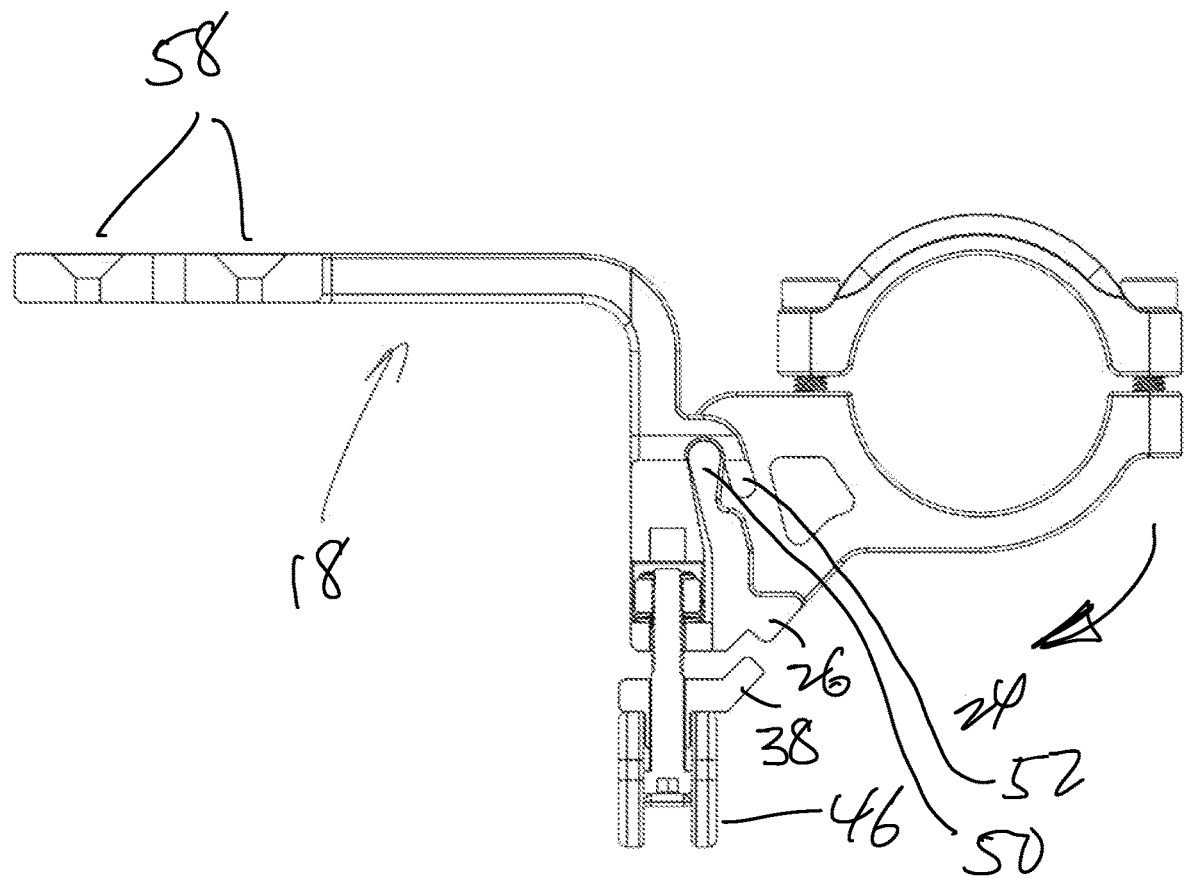
Figure 44:
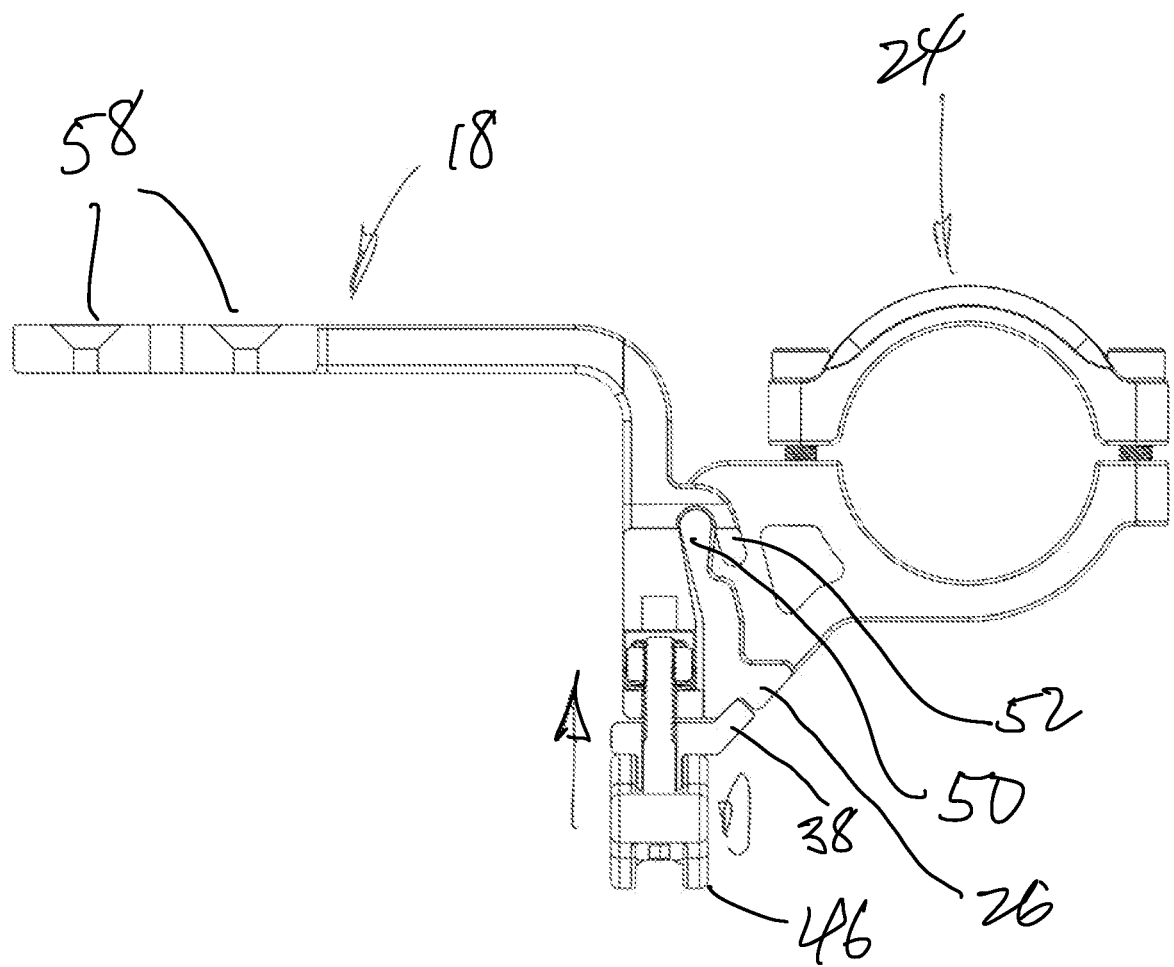

In FIGS. 39 and 40, the accessory attachment member 18 is brought close to the mounting member 20 and then the hanger portion 52 is guided over the hanger seat 50, as in FIG. 41. Further engagement is shown in FIG. 42 where the hanger portion 52 is now resting on the hanger seat 50 albeit at an angle. In FIG. 43, the accessory attachment member 18 is rotated into place which is made possible due to the springs 44 maintain the lower jaw 38 in an open and unlocked condition. Once the accessory attachment member 18 is rotated into place and the cleat 26 and notch 28 is aligned over the lower jaw 38, the cam lever 46 is rotated to a locked position, as seen in FIGS. 36-38.

It should also be noted that the cam lever 46 can be configured to lock by a clockwise or counterclockwise rotation of the cam lever 46 while it can be configured to lock in an opposite direction. As an example, the cam lever 46 in FIGS. 36-38 locks by a counterclockwise rotation but it can be configured to be in the opposite direction.

The components of the quick-release interconnect system 10 are preferably made of metal, such as machined aluminum, for durability but may be made of other materials such as plastic. Also, some components may be made of different materials from each other.

In general, any object can be releasably mounted to another surface or substrate using the present invention. More specifically, the attachment member may be modified to receive any object. Also, the mount member 20 can also be modified to be capable of securing to any surface or subject other than handle bars 14 and in an environment other than a bicycle environment. For example, the mount member 20 may include a plate with holes therethrough instead of clamps 24 to secure the mount member 20 to a wall while the attachment member 22 includes a sport camera amount. In that further example usage case, the invention works in the same fashion but the mounting methods are modified to suit the environment, use at hand and the object to be releasably secured in place. Thus, the present invention may be used for many different purposes using the new and novel quick-release interconnect mechanism 10 disclosed herein.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A quick-release interconnect, comprising:
    an attachment member including a main body member, a lower jaw movably connected thereto, a hanger member, a cam lever in communication with the lower jaw to actuate the lower jaw;
    a mount member having a cleat and a hanger seat;
    the lower jaw and main body member defining a space therebetween when the lower jaw is in an open condition;
    wherein the hanger member is positionable on the hanger seat and a free end of the lower jaw is releasably engageable with the cleat, and
    wherein rotation of the cam lever actuates the lower jaw toward the main body member to capture the cleat between the hanger member and the lower jaw to releasably secure the attachment member to the mount member.

2. The quick-release interconnect of claim 1, wherein the cleat includes a notch that communicates with the lower jaw.

3. The quick-release interconnect of claim 1, further comprising at least one spring that is configured and arranged to spring-bias the lower jaw into an open condition.

* * * * *